US012537344B2

(12) United States Patent
Hou et al.

(10) Patent No.: US 12,537,344 B2
(45) Date of Patent: Jan. 27, 2026

(54) HIGH SPEED PLUG CONNECTOR

(71) Applicant: Amphenol Commercial Products (Chengdu) Co., Ltd., Chengdu (CN)

(72) Inventors: Yaohua Hou, Chengdu (CN); Xiaodong Hu, Chengdu (CN); Wenfeng Yin, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 419 days.

(21) Appl. No.: 18/323,469

(22) Filed: May 25, 2023

(65) Prior Publication Data

US 2023/0387634 A1 Nov. 30, 2023

(30) Foreign Application Priority Data

May 30, 2022 (CN) ......................... 202221323564.5

(51) Int. Cl.
*H01R 13/6585* (2011.01)
*H01R 13/6471* (2011.01)

(52) U.S. Cl.
CPC ................................ *H01R 13/6585* (2013.01)

(58) Field of Classification Search
CPC .............. H01R 12/724; H01R 13/6471; H01R 13/6585
See application file for complete search history.

(56) References Cited

U.S. PATENT DOCUMENTS 7,335,063 B2 2/2008 Cohen et al.
7,581,990 B2 9/2009 Kirk et al.
(Continued)

FOREIGN PATENT DOCUMENTS

CN 2840353 Y 11/2006
CN 202585857 U 12/2012
(Continued)

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.
(Continued)

*Primary Examiner* — Abdullah A Riyami
*Assistant Examiner* — Thang H Nguyen
(74) *Attorney, Agent, or Firm* — Wolf, Greenfield & Sacks, P.C.

(57) ABSTRACT

Plug connectors for use with high speed signals. The connector includes an insulative housing having a base portion and a tongue portion extending from the base portion, and conductive terminals held by the housing. Each conductive terminal has a mating portion held on a side of the tongue portion, a tail portion extending out of the housing, and an intermediate portion held in the base portion. The conductive terminals comprise signal terminals and ground terminals. A shielding member is disposed in the housing and includes features configured to provide shielding to signal terminals and electrically connect ground terminals. The shielding member also includes features configured to improve impedance consistency along conduction paths. Such a configuration meets signal integrity requirements in connectors designed for higher frequencies, while conforming to a standard that constrains mating and mounting interfaces.

20 Claims, 12 Drawing Sheets

(56) References Cited

U.S. PATENT DOCUMENTS

| | | | | |
|---|---|---|---|---|
| 8,462,502 | B2 | 6/2013 | Hirano et al. | |
| 8,480,413 | B2 * | 7/2013 | Minich | H01R 12/724 439/607.05 |
| 8,585,440 | B2 | 11/2013 | Jiang et al. | |
| 8,657,627 | B2 | 2/2014 | McNamara et al. | |
| 8,702,451 | B2 * | 4/2014 | Luo | H01R 12/725 439/637 |
| 8,740,631 | B2 | 6/2014 | Chen | |
| 8,858,243 | B2 | 10/2014 | Luo et al. | |
| 9,077,118 | B2 * | 7/2015 | Szu | H01R 13/658 |
| 9,225,090 | B2 | 12/2015 | Chen | |
| 9,407,022 | B1 | 8/2016 | Wang | |
| 9,520,680 | B2 * | 12/2016 | Hsu | H01R 13/6471 |
| 9,564,714 | B1 | 2/2017 | Wang et al. | |
| 9,831,605 | B2 | 11/2017 | Buck et al. | |
| 9,941,641 | B1 * | 4/2018 | Jiang | H01R 13/6599 |
| 9,985,391 | B1 | 5/2018 | Wang | |
| 10,283,910 | B1 * | 5/2019 | Chen | H01R 4/04 |
| 10,411,376 | B1 * | 9/2019 | Wang | H01R 13/502 |
| 10,651,589 | B1 * | 5/2020 | Wang | H01R 12/7052 |
| 10,763,608 | B1 * | 9/2020 | Wang | H01R 27/00 |
| 11,050,176 | B2 * | 6/2021 | Yang | H01R 43/02 |
| 11,251,554 | B1 * | 2/2022 | Tan | H01R 12/716 |
| 11,581,687 | B2 | 2/2023 | Wang et al. | |
| 2007/0205774 | A1 * | 9/2007 | Minich | H01R 13/514 324/538 |
| 2014/0211389 | A1 | 7/2014 | Zhou et al. | |
| 2018/0205181 | A1 | 7/2018 | Chen et al. | |
| 2019/0214753 | A1 * | 7/2019 | Jiang | H01R 12/721 |
| 2020/0028289 | A1 * | 1/2020 | Dai | H01R 13/6595 |
| 2021/0044060 | A1 * | 2/2021 | Wu | H01R 12/725 |
| 2021/0135389 | A1 * | 5/2021 | Jiang | H01R 13/516 |
| 2021/0135404 | A1 * | 5/2021 | Jiang | H01R 12/724 |
| 2021/0234315 | A1 * | 7/2021 | Ellison | H01R 13/502 |
| 2021/0399455 | A1 | 12/2021 | Wang et al. | |
| 2022/0077614 | A1 | 3/2022 | Tan et al. | |
| 2022/0173537 | A1 * | 6/2022 | Fan | H01R 13/6461 |
| 2022/0302655 | A1 * | 9/2022 | Wang | H01R 13/6587 |
| 2022/0360000 | A1 * | 11/2022 | Tan | H01R 12/727 |
| 2023/0026708 | A1 * | 1/2023 | Carbaugh | H01R 43/20 |
| 2023/0047671 | A1 | 2/2023 | Wang et al. | |
| 2023/0050934 | A1 | 2/2023 | Yin et al. | |
| 2023/0122686 | A1 | 4/2023 | Wang et al. | |
| 2023/0124724 | A1 | 4/2023 | Tan et al. | |
| 2023/0125645 | A1 | 4/2023 | Yin et al. | |

FOREIGN PATENT DOCUMENTS

| | | | |
|---|---|---|---|
| CN | 203205638 | U | 9/2013 |
| CN | 103515792 | A | 1/2014 |
| CN | 203850501 | U | 9/2014 |
| CN | 204376132 | U | 6/2015 |
| CN | 205016785 | U | 2/2016 |
| CN | 103887641 | B | 6/2016 |
| CN | 205944534 | U | 2/2017 |
| CN | 104283080 | A | 4/2017 |
| CN | 206962152 | U | 2/2018 |
| CN | 207116835 | U | 3/2018 |
| CN | 207517943 | U | 6/2018 |
| CN | 109004437 | A | 12/2018 |
| CN | 208284706 | U | 12/2018 |
| CN | 208433570 | U | 1/2019 |
| CN | 209675519 | U | 11/2019 |
| CN | 109659740 | B | 9/2020 |
| CN | 112103723 | A | 12/2020 |
| CN | 212380677 | U | 1/2021 |
| CN | 111769395 | B | 2/2022 |
| CN | 215816686 | U | 2/2022 |
| TW | I505580 | B | 10/2015 |
| TW | I509921 | B | 11/2015 |
| TW | M546036 | U | 7/2017 |
| TW | M563682 | U | 7/2018 |
| TW | M573906 | U | 2/2019 |
| TW | M584561 | U | 10/2019 |
| TW | M606366 | U | 1/2021 |
| TW | M618868 | U | 11/2021 |
| TW | M621514 | U | 12/2021 |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

He et al., High Speed Electrical Connector, U.S. Appl. No. 18/354,819, filed Jul. 19, 2023.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

* cited by examiner

HIGH SPEED PLUG CONNECTOR

RELATED APPLICATION

This application claims priority to and the benefit of Chinese Patent Application Serial No. 202221323564.5, filed on May 30, 2022, entitled "PLUG CONNECTOR." The contents of this application are incorporated herein by reference in their entirety.

FIELD

This application relates to interconnection systems, such as those including electrical connectors, configured to interconnect electronic assemblies.

BACKGROUND

Electrical connectors may be used to provide electrical connections between different electronic systems through conductive terminals so as to enable signal and/or power transfer. One type of electrical connector is a "storage drive connector," which may be configured to provide an industry-standard interface such as SFF-8639 to establish electrical connections between a storage drive (e.g., a hard disk drive (HDD), a solid state drive (SSD), an optical disk drive (ODD)) and a circuit board (e.g., a backplane, a midplane, a drive carrier board). Such electrical connector typically includes a plug connector and a receptacle connector mated with each other. For example, the plug connector may be configured to be mounted to the circuit board, and the receptacle connector may be configured to connect the storage drive to the plug connector. In this way, the plug connector and the receptacle connector can establish electrical connections between the storage driver and the circuit board so as to enable signal and/or power transfer.

BRIEF SUMMARY

Aspects of the present application relate to high speed plug connectors.

Some embodiments relate to a plug connector. The plug connector may comprise an insulative housing comprising a base portion and a tongue portion extending from the base portion; a shielding member disposed in the insulative housing, the shielding member comprising a conductive member and lossy material disposed on the conductive member; and a plurality of conductive terminals held on opposite sides of the shielding member by the insulative housing such that mating portions of the plurality of conductive terminals are exposed through two opposite outer surfaces of the tongue portion and tail portions of the plurality of conductive terminals extend from a side of the base portion opposite to the tongue portion, the plurality of conductive terminals comprising signal terminals and ground terminals, wherein the lossy material may be configured to electrically couple at least two of the ground terminals together.

Optionally, the conductive member may comprise a first surface on a first side of the opposite sides and a second surface on a second side of the opposite sides; the plurality of conductive terminals may be arranged in a first group of conductive terminals and a second group of conductive terminals on the opposite sides; the lossy material may comprise a plurality of protrusions extending from the second surface of the conductive member; and each of the plurality of protrusions may contact a corresponding one of the at least two ground terminals.

Optionally, the insulative housing may comprise terminal slots for holding the plurality of conductive terminals; and the second surface of the shield may be at least partially exposed in the terminal slots.

Optionally, the signal terminals may comprise a first plurality of differential signal pairs disposed on the second side of the opposite sides of the conductive member and between ground terminals; and each signal terminal of the first plurality of differential signal pairs may comprise a portion separated from the conductive member by air.

Optionally, the signal terminals may further comprise a second plurality of differential signal pairs disposed on the first side of the opposite sides of the conductive member and between ground terminals; each signal terminal of the second plurality of differential signal pairs may be separated from the conductive member by the one of the two opposite outer surfaces of the tongue portion on the first side of the opposite sides of the conductive member; the first plurality of differential signal pairs may be configured according to PCIe; and the second plurality of differential signal pairs may be configured according to SAS/SATA/SATA Express.

Optionally, the shielding member may be closer to the second group of conductive terminals than the first group of conductive terminals.

Optionally, the tongue portion may extend from the base portion in a mating direction; the mating portions of the plurality of conductive terminals may be oriented in the mating direction; and the conductive member may extend at least in the tongue portion in the mating direction.

Optionally, the signal terminals may comprise at least one pair of signal terminals; each pair of the at least one pair of signal terminals may be configured as a differential signal pair; the conductive member may comprise at least one first opening; and each of the at least one first opening may extend through the conductive member and may at least partially overlap with the mating portions of a corresponding pair of the at least one pair of signal terminals.

Optionally, the plug connector may be configured to be plugged into a receptacle connector such that the mating portions of the at least one pair of signal terminals mate with corresponding terminals of the receptacle connector; and the at least one first opening may be configured to overlap with a mating contact portion where the mating portions of the at least one pair of signal terminals mate with the corresponding terminals of the receptacle connector.

Optionally, the insulative housing may comprise portions disposed in the at least one first opening.

Some embodiments relate to a plug connector. The plug connector may comprise an insulative housing comprising a base portion elongated in a longitudinal direction and a tongue portion extending from the base portion in a mating direction perpendicular to the longitudinal direction; a plurality of conductive terminals, each of the plurality of conductive terminals comprising a mating portion held by the tongue portion of the insulative housing, a tail portion opposite the mating portion and extending out of the insulative housing, and an intermediate portion extending between the mating portion and the tail portion and held in the base portion of the insulative housing; and a shielding member disposed in the insulative housing, the shielding member comprising a conductive member extending from the base portion to the tongue portion of the insulative housing, and a protrusion protruding from the conductive member towards a respective conductive terminal and extending from an edge portion of the tongue portion to a joint of the tongue portion and the base portion.

Optionally, the protrusion may be in direct contact with the mating portion of the respective conductive terminal.

Optionally, the tongue portion may comprise a plurality of terminal slots recessed into the tongue portion from two opposite outer surfaces of the tongue portion; the mating portions of the plurality of electrically conductive terminals may be received in respective ones of the plurality of terminal slots; and the protrusion may be exposed at a bottom of a corresponding one of the plurality of terminal slots.

Optionally, the plurality of conductive terminals may be arranged in a first group of conductive terminals and a second group of conductive terminals in the longitudinal direction on opposite sides of the shielding member; at least one of the first and second groups of conductive terminals may comprise a plurality of pairs of differential signal terminals and ground terminals disposed between adjacent pairs of the plurality of differential signal terminals; and the shielding member may comprise lossy material comprising a plurality of protrusions, the plurality of protrusions comprising the protrusion, each of the plurality of protrusions protruding from the conductive member towards a respective ground terminal and configured to electrically connect the ground terminals.

Optionally, each of the first and second groups of conductive terminals may comprise a plurality of pairs of differential signal terminals, and ground terminals disposed between adjacent pairs of the plurality of pairs of signal terminals; the plurality of protrusions may comprise a plurality of first protrusions extending towards the ground terminals in the first group of conductive terminals and a plurality of second protrusions extending towards the ground terminals in the second group of conductive terminals; each of the plurality of first protrusions may extend from the edge portion of the tongue portion to the joint of the tongue portion and the base portion; and each of the plurality of second protrusions may extend from the edge portion of the tongue portion into the base portion.

Optionally, the plurality of first protrusions may be offset from the plurality of second protrusions in the longitudinal direction.

Some embodiments relate to a plug connector. The plug connector may comprise an insulative housing comprising a base portion and a tongue portion extending from the base portion; a shielding member comprising a conductive member disposed in the tongue portion and lossy material extending from opposite sides of the conductive member; and a plurality of conductive terminals, each of the plurality of conductive terminals comprising a mating portion held by the tongue portion of the insulative housing, a tail portion opposite the mating portion and extending out of the insulative housing, and an intermediate portion extending between the mating portion and the tail portion and held in the base portion of the insulative housing, wherein: the plurality of conductive terminals may comprise a first plurality of differential signal pairs disposed on the second side of the opposite sides of the conductive member; and each conductive terminal of the first plurality of differential signal pairs may comprise a portion separated from the conductive member by air.

Optionally, the plurality of conductive terminals may comprise a second plurality of differential signal pairs disposed on the first side of the opposite sides of the conductive member; and each conductive terminal of the second plurality of differential signal pairs may be separated from the conductive member by an outer surface of the tongue portion of the insulative housing.

Optionally, the conductive member may comprise a plurality of first openings; and each first opening may be aligned with mating contact portions of the mating portions of a respective pair of the first plurality of differential signal pairs.

Optionally, the conductive member may comprise a plurality of second openings; and the lossy material may extend from the first side of the conductive member through the plurality of second openings to the second side of the conductive member.

Some embodiments relate to a plug connector. The plug connector may comprise: an insulative housing comprising a base portion and a tongue portion extending from the base portion; a shielding member disposed in the insulative housing, the shielding member comprising a conductive member and a lossy material disposed on the conductive member; and a plurality of conductive terminals held on opposite sides of the shielding member by the insulative housing such that mating portions of the plurality of conductive terminals may be exposed through two opposite outer surfaces of the tongue portion and tail portions of the plurality of conductive terminals may extend from a side of the base portion opposite to the tongue portion, the plurality of conductive terminals comprising signal terminals and ground terminals; wherein the lossy material may be configured to electrically couple at least two of the ground terminals together.

Optionally, the conductive member may comprise a first surface on a first side of the opposite sides and a second surface on a second side of the opposite sides, the plurality of conductive terminals may be arranged in a first group of conductive terminals and a second group of conductive terminals on the opposite sides, and the lossy material may comprise a first portion disposed on the first surface of the conductive member.

Optionally, the first portion may be separated from the first group of conductive terminals by an insulative material.

Optionally, the insulative material may be an insulative material forming the insulative housing.

Optionally, the lossy material may comprise a plurality of protrusions extending from the second surface of the conductive member, and each of the plurality of protrusions may contact a corresponding one of the at least two ground terminals.

Optionally, the insulative housing may comprise terminal slots for holding the plurality of conductive terminals, and the second surface of the shield may be at least partially exposed in the terminal slots.

Optionally, the signal terminals comprise a first plurality of differential signal pairs disposed between ground terminals, each signal terminal of the first plurality of differential signal pairs may comprise a portion separated from the conductive member by air.

Optionally, the signal terminals further may comprise a second plurality of differential signal pairs, each signal terminal of the second plurality of differential signal pairs may be separated from the conductive member by an insulative material.

Optionally, the first plurality of differential signal pairs and the second plurality of differential signal pairs may be held on the opposite sides of the shield mechanism, respectively.

Optionally, the first plurality of differential signal pairs may be configured according to PCIe.

Optionally, the second plurality of differential signal pairs may be configured according to SAS/SATA/SATA Express.

Optionally, the shielding member may be closer to one of the first and second groups of conductive terminals compared to the other of the first and second groups of conductive terminals.

Optionally, the tongue portion may extend from the base portion in a mating direction and the mating portions of the plurality of conductive terminals may be oriented in the mating direction, and wherein the conductive member may extend at least in the tongue portion in the mating direction.

Optionally, the signal terminals may comprise at least one pair of signal terminals, each pair of the at least one pair of signal terminals may be configured as a differential signal pair, and the conductive member may have at least one first opening, each of the at least one first opening may extend through the conductive member and at least partially overlaps with the mating portions of a corresponding pair of the at least one pair of signal terminals.

Optionally, the plug connector may be configured to be plugged into a receptacle connector such that the mating portions of the at least one pair of signal terminals mate with corresponding terminals of the receptacle connector, and wherein the at least one first opening may be configured to completely overlap with a mating contact portion where the mating portions of the at least one pair of signal terminals mate with the corresponding terminals, when the plug connector may be plugged into the receptacle connector.

Optionally, the lossy material may not overlap with the at least one first opening.

Optionally, the insulative housing may completely fill the at least one first opening.

Optionally, the insulative housing may not overlap with the at least one first opening.

Optionally, the at least one pair of signal terminals may be a plurality of pairs of signal terminals and wherein the at least two ground terminals may separate each pair of the plurality of pairs of signal terminals from each other.

Optionally, each of the plurality of conductive terminals further may comprise an intermediate portion extending between the mating portion and the tail portion, the intermediate portion may be held in the base portion of the insulative housing, the conductive member may extend in the mating direction along substantially the entire length of the contact and intermediate portions of the signal terminals and the ground terminals.

Optionally, the base portion may be elongated in a longitudinal direction perpendicular to the mating direction and wherein an extending range of the conductive member in the longitudinal direction may at least overlap with the signal terminals and the ground terminals.

Optionally, the conductive member may be oriented parallelly to the mating direction and to the longitudinal direction.

Optionally, the lossy material may comprise at least two protrusions protruding from the conductive member and extending towards the at least two ground terminals, the lossy material may be electrically coupled to a corresponding one of the at least two ground terminals through each of the at least two protrusions.

Optionally, each of the at least two protrusions may be electrically coupled to at least the mating portion of the corresponding one of the at least two ground terminals.

Optionally, each of the plurality of conductive terminals may comprise an intermediate portion extending between the mating portion and the tail portion, the intermediate portion may be held in the base portion of the insulative housing, each of the at least two protrusions may be electrically coupled to the intermediate portion and the mating portion of the corresponding one of the at least two ground terminals.

Optionally, each of the at least two protrusions may be in direct contact with the corresponding one of the at least two ground terminals.

Optionally, the tongue portion may comprise a plurality of terminal slots recessed into the tongue portion from the two opposite outer surfaces, the mating portion of each of the plurality of electrically conductive terminals may be received in a corresponding one of the plurality of terminal slots, and at least a portion of each of the at least two protrusions may be exposed at a bottom of the corresponding one of the plurality of terminal slots to be in direct contact with the mating portion of the corresponding one of the ground terminals.

Optionally, each of the at least two protrusions may be capacitively coupled to at least a corresponding one of the at least two ground terminals.

Optionally, each of the at least two protrusions may be separated from a corresponding one of the at least two ground terminals by the insulative housing.

Optionally, the base portion may be elongated in the longitudinal direction and the plurality of conductive terminals may be arranged in a first group of conductive terminals and a second group of conductive terminals in the longitudinal direction on the opposite sides of the shielding member, at least one of the first and second groups of conductive terminals may comprise ground terminals and a plurality of pairs of signal terminals, each pair of the plurality of pairs of signal terminals may be configured as a differential signal pair, the ground terminals may separate each pair of the plurality of pairs of signal terminals from each other, and the lossy material may be electrically coupled to a corresponding one of the ground terminals by each of the at least two protrusions.

Optionally, each of the first and second groups of conductive terminals may comprise ground terminals and a plurality of pairs of signal terminals, each pair of the plurality of pairs of signal terminals may be configured as a differential signal pair, the ground terminals separate each pair of the plurality of pairs of signal terminals from each other, and the at least two protrusions may comprise a plurality of first protrusions extending towards the ground terminals in the first group of conductive terminals and a plurality of second protrusions extending towards the ground terminals in the second group of conductive terminals, each of the plurality of first protrusions may be electrically coupled to a corresponding one of the ground terminals in the first group of conductive terminals, and each of the plurality of second protrusions may be electrically coupled to a corresponding one of the ground terminals in the second group of conductive terminals.

Optionally, the plurality of first protrusions may be offset from the plurality of second protrusions in the longitudinal direction.

Optionally, the tongue portion may extend from the base portion in the mating direction and wherein the mating portions of the plurality of conductive terminals may be oriented in the mating direction, each of the at least two protrusions may be elongated in the mating direction.

Optionally, the conductive member may have at least one second opening extending through the conductive member, and the lossy material may extend from a first side of the conductive member through the at least one second opening to a second side of the conductive member opposite to the first side, the at least one second opening may not overlap with the at least one first opening.

Optionally, the at least one second opening may at least partially overlap with the region where the lossy material may be electrically coupled with the at least two ground terminals.

Optionally, the conductive member may comprise a plurality of conductive member sections and wherein the lossy material may comprise a plurality of lossy material sections, each of the plurality of lossy material sections may be disposed on a corresponding one of the plurality of conductive member sections.

Optionally, the lossy material may be a lossy material piece overmolded on the conductive member.

Optionally, the insulative housing may be an insulative material piece overmolded on the shielding member.

Optionally, the conductive member may be a metal conductive member formed from a metal.

Optionally, the tail portion may be configured to be mounted to a circuit board.

Optionally, the plug connector may be configured to be plugged into a receptacle connector in a mating direction such that the mating portions of the signal terminals contact first mating terminals of the receptacle connector and the mating portions of the ground terminals contact second mating terminals of the receptacle connector, the tongue portion may extend from the base portion in the mating direction and the mating portions of the plurality of conductive terminals may extend away from the base portion in the mating direction at the two opposite outer surfaces of the tongue portion, wherein the mating portions of the signal terminals may extend by a shorter length than the mating portions of the ground terminals, and a section of an edge portion of the tongue portion corresponding to the mating portion of the signal terminal in the mating direction may be shaped with a recessed portion, the recessed portion may be configured to receive the first mating terminal, when the plug connector is plugged into the receptacle connector, such that the first and second mating terminals can touch with the tongue portion in sequence.

Optionally, the edge portion may be formed with a first guiding surface to guide the second mating terminal to slide onto the tongue portion before the first mating terminal enters the recessed portion, and the recessed portion may be recessed into the tongue portion towards the base portion in the mating direction from the first guiding surface.

Optionally, the recessed portion may extend towards the base portion in the mating direction to terminate in a second guiding surface configured to guide the first mating terminal to slide onto the tongue portion.

Optionally, at least one of the first and second guiding surfaces may be beveled.

Optionally, at least one of the first and second guiding surfaces may be inclined at an angle of 10° to 45° relative to the mating direction.

Optionally, a projection of the first guiding surface in the mating direction may not overlap with a projection of the second guiding surface in the mating direction.

Optionally, the two opposite outer surfaces of the tongue portion may comprise a first outer surface and a second outer surface, the tongue portion further may comprise a third outer surface facing away from the base portion in the mating direction and connecting the first outer surface with the second outer surface, the edge portion may be at least one of a first edge portion connecting the first outer surface with the third outer surface and a second edge portion connecting the second outer surface with the third outer surface.

Optionally, the recessed portion may be recessed into the tongue portion in the mating direction by a distance equal to the difference between the length by which the mating portion of the ground terminal may extend and the length by which the mating portion of the signal terminal may extend.

Optionally, the signal terminals may comprise at least one pair of signal terminals, each pair of the at least one pair of signal terminals may comprise two adjacent signal terminals, the two adjacent signal terminals may have a transverse width equal to the sum of the widths of the two adjacent signal terminals and the spacing between the two adjacent signal terminals, and a recessed portion of the recessed portions corresponding to each pair of the at least one pair of signal terminals may have a width greater than or equal to the transverse width in a direction along the edge portion.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures is represented by a like numeral. For purposes of clarity, not every component may be labeled in every drawing. In the drawings.

LIST OF REFERENCE NUMERALS

1 plug connector

100 insulative housing

Figure 1:
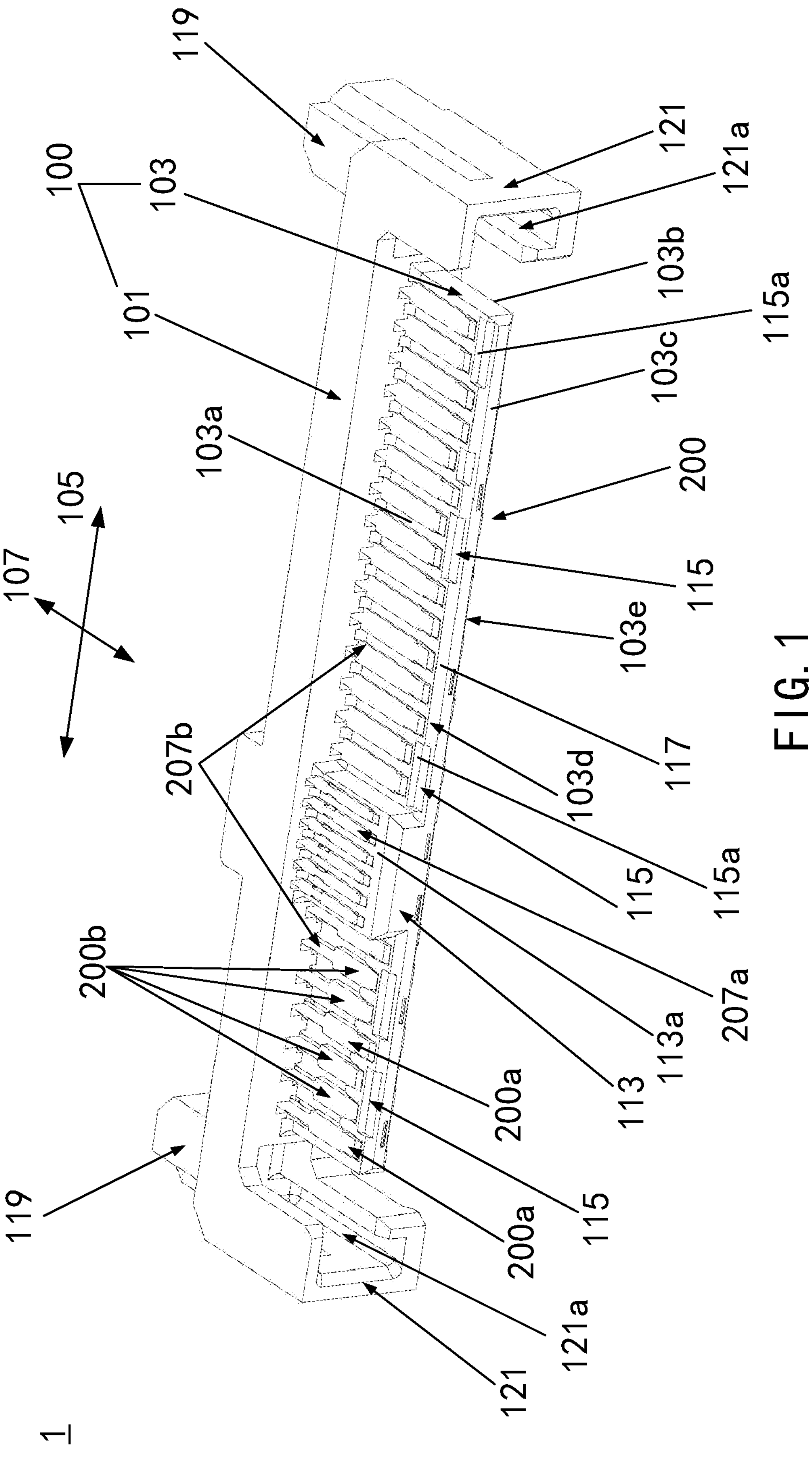
FIG. 1 is a top, front perspective view of a plug connector, according to some embodiments.
Figure 2:
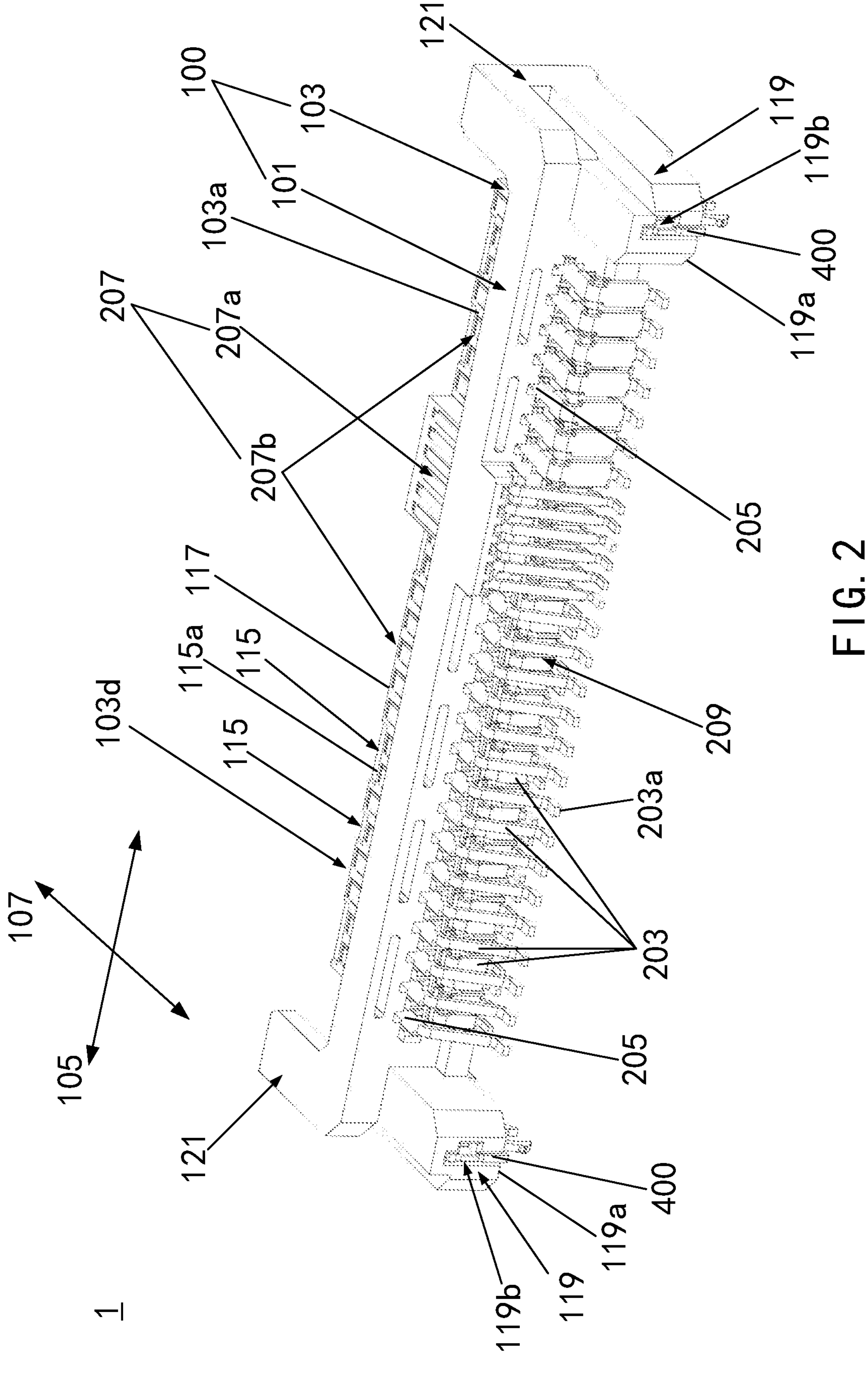
FIG. 2 is a top, rear perspective view of the plug connector of FIG. 1.
Figure 3:
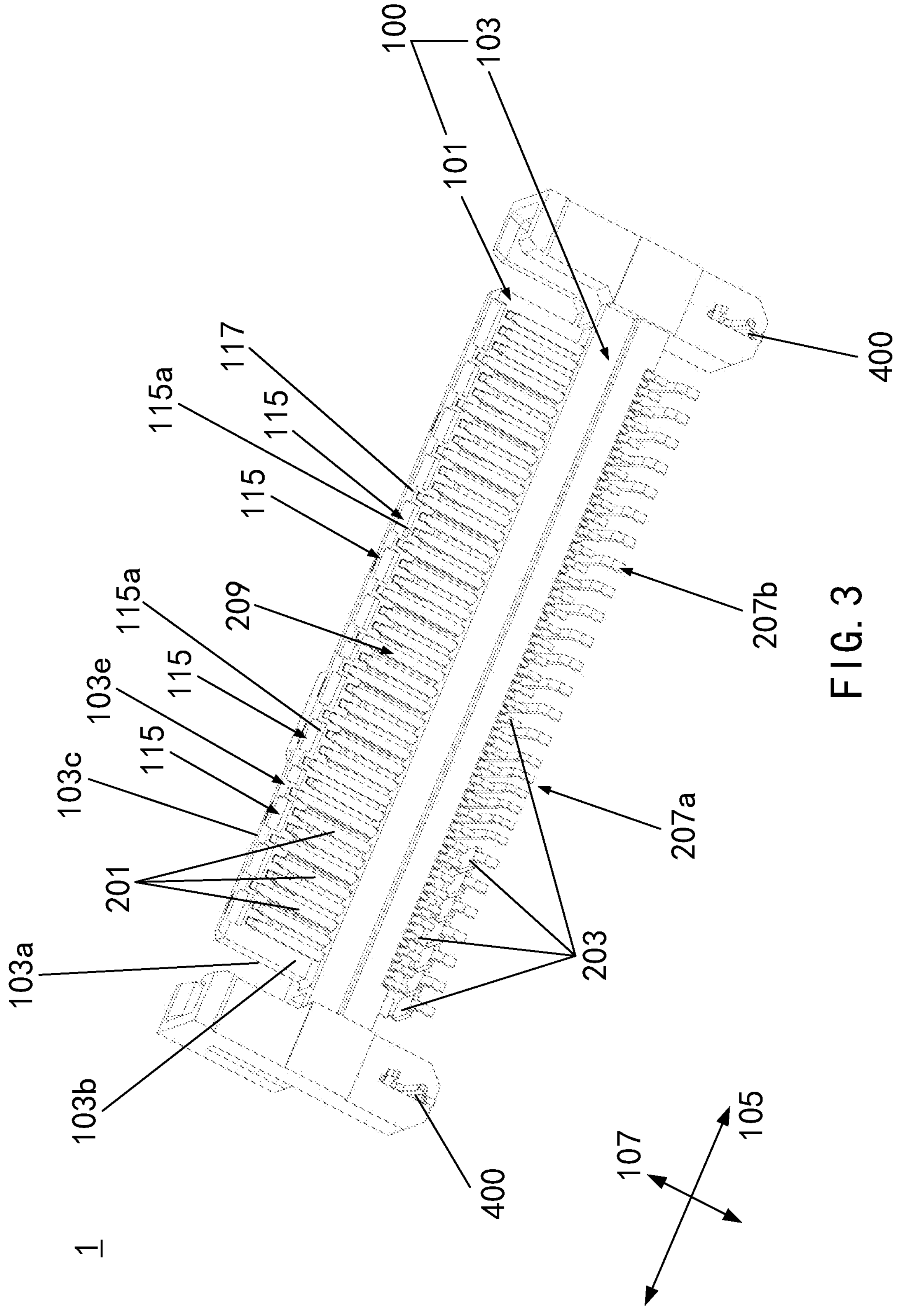
FIG. 3 is a bottom perspective view of the plug connector of FIG. 1.

101 base portion
103 tongue portion
103*a* first outer surface
103*b* second outer surface
103*c* third outer surface
103*d* first edge portion
103*e* second edge portion
105 longitudinal direction
107 mating direction
109 terminal slot
113 first platform
113*a* first platform surface
115 recessed portion
115*a* second guiding surface
117 first guiding surface
119 mounting portion
119*a* mounting surface
119*b* board lock receiving feature
121 receiving portion
121*a* receiving slot
200 conductive terminal
200*a* ground terminal
200*b* signal terminal
201 mating portion
203 tail portion
205 intermediate portion
207 first group of conductive terminals
207*a* first subgroup of conductive terminals
207*b* second subgroup of conductive terminals
209 second group of conductive terminals
300 shielding member
301 conductive member
301*a* conductive member section
301*b* conductive member section
301*c* conductive member section
302 first surface
304 second surface
303 lossy material
303*a* lossy material section
303*b* lossy material section
303*c* lossy material section
3031 first portion of the lossy material
305 first opening
307*a* first protrusion
307*b* second protrusion
309 second opening
400 board lock.

DETAILED DESCRIPTION

The inventors have recognized and appreciated connector designs that satisfy electrical and mechanical requirements to support greater bandwidth through high frequency operation. Some of these techniques may synergistically support higher frequency connector operation, satisfy the physical requirements set by industry standards such as PCIeSAS, and meet requirements for mass manufacturing, including cost, time and reliability. A plug connector satisfying the mechanical requirements of the PCIeSAS specification at the performance required for GEN 5 and beyond is used as an example of a connector in which these techniques have been applied.

The plug connector may include an insulative housing having a base portion and a tongue portion. The base portion may be elongated in a longitudinal direction. The tongue portion may extend from the base portion in a mating direction perpendicular to the longitudinal direction. The tongue portion may have outer surfaces opposite to each other in a transverse direction perpendicular to both the longitudinal direction and the mating direction. The insulative housing may have terminal slots recessed into the tongue portion from respective outer surfaces of the tongue portion. The terminal slots may extend into the base portion.

The plug connector may include conductive terminals held by the housing. Each conductive terminal may have a mating portion held on a side of the tongue portion, a tail portion extending out of the base portion of the housing, and an intermediate portion extending between the mating portion and the tail portion and held in the base portion. The conductive terminals may be arranged in a first group of conductive terminals disposed on a first side of the tongue portion and a second group of conductive terminals disposed on a second side of the tongue portion. The second group of conductive terminals may include a first plurality of pairs of differential signal terminals and ground terminals disposed between adjacent pairs of differential signal terminals. The first group of conductive terminals may include a second plurality of pairs of differential signal terminals and ground terminals disposed between adjacent pairs of differential signal terminals. The first plurality of differential signal pairs may be configured according to PCIe, and the second plurality of differential signal pairs may be configured according to SAS/SATA/SATA Express.

A shielding member may be disposed in the housing and include features configured to provide shielding to the signal terminals and electrically connect the ground terminals. The shielding member may also include features configured to improve impedance consistency along conduction paths. In some embodiments, the shielding member may include a conductive member and lossy material disposed on opposite sides of the conductive member. The conductive member may be disposed in the insulative housing and extend in both the base portion and the tongue portion. A first side of the conductive member may be embedded in the tongue portion and therefore separated from the first group of conductive terminals by a first outer surface of the tongue portion. A second side of the conductive member may be at least partially exposed through the terminal slots, and therefore each conductive terminal of the first plurality of differential signal pairs may comprise a portion separated from the second side of the conductive member by air. The conductive member may comprise first openings and second openings. Each first opening may be aligned with mating contact portions of the mating portions of a respective pair of the first plurality of differential signal pairs. The lossy material may extend from the first side of the conductive member through the plurality of second openings to the second side of the conductive member.

The lossy material may comprise first protrusions extending from the conductive member towards the ground terminals in the first group of conductive terminals, and second protrusions extending from the conductive member towards the ground terminals in the second group of conductive elements. Each first protrusion may extend from an edge portion of the tongue portion to the joint of the tongue portion and the base portion. Each second protrusions may extend from the edge portion of the tongue portion into the base portion. The first protrusions may be offset from the plurality of second protrusions in the longitudinal direction. Such a configuration meets signal integrity requirements in connectors designed for higher frequencies, while conforming to a standard that constrains mating and mounting interfaces.

Embodiments of the present application are described in detail below in conjunction with the accompanying drawings. It should be appreciated that these embodiments are not intended to limit the present application.

FIGS. 1 to 17 illustrate a plug connector 1. The plug connector 1 may be combined with a receptacle connector (not shown) to constitute an electrical connector assembly. Such an electrical connector assembly is capable of providing an industry-standard interface such as SFF-8639 to establish an electrical connection between a storage drive (such as a hard disk drive (HDD), a solid state drive (SSD), an optical disk drive (ODD)) and a circuit board (such as a backplane, a midplane, a drive carrier board). The plug connector 1 is configured to be mounted to a circuit board (not shown), and the receptacle connector is configured to connect a storage drive to the plug connector 1, whereby the plug connector 1 may establish an electrical connection between the circuit board and the receptacle connector, and the receptacle connector may establish an electrical connection between the storage drive and the plug connector 1. In this way, the electrical connection assembly composed of the plug connector 1 and the receptacle connector may establish an electrical connection between the storage drive and the circuit board so as to enable signal and/or power transfer. Such an electrical connector assembly may be referred to as a "storage drive connector".

As shown in FIGS. 1 to 12, the plug connector 1 includes an insulative housing 100. The insulative housing 100 includes a base portion 101 and a tongue portion 103 extending from the base portion 101. The base portion 101 is elongated in a longitudinal direction 105. The tongue portion 103 extends from the base portion 101 in a mating direction 107 and is configured to be inserted into a receptacle connector (not shown) that mates with the plug connector 1. The longitudinal direction 105 may be perpendicular to the mating direction 107. The base portion 101 is integral with the tongue portion 103. The insulative housing 100 may be formed by any suitable manufacturing process in the art such as injection molding. The insulative housing 100 may be partially or entirely formed of an insulative material. Examples of insulative materials that are suitable for forming the insulative housing 100 include, but are not limited to, plastic, nylon, liquid crystal polymer (LCP), polyphenyline sulfide (PPS), high temperature nylon or polyphenylenoxide (PPO) or polypropylene (PP).

Figure 5:
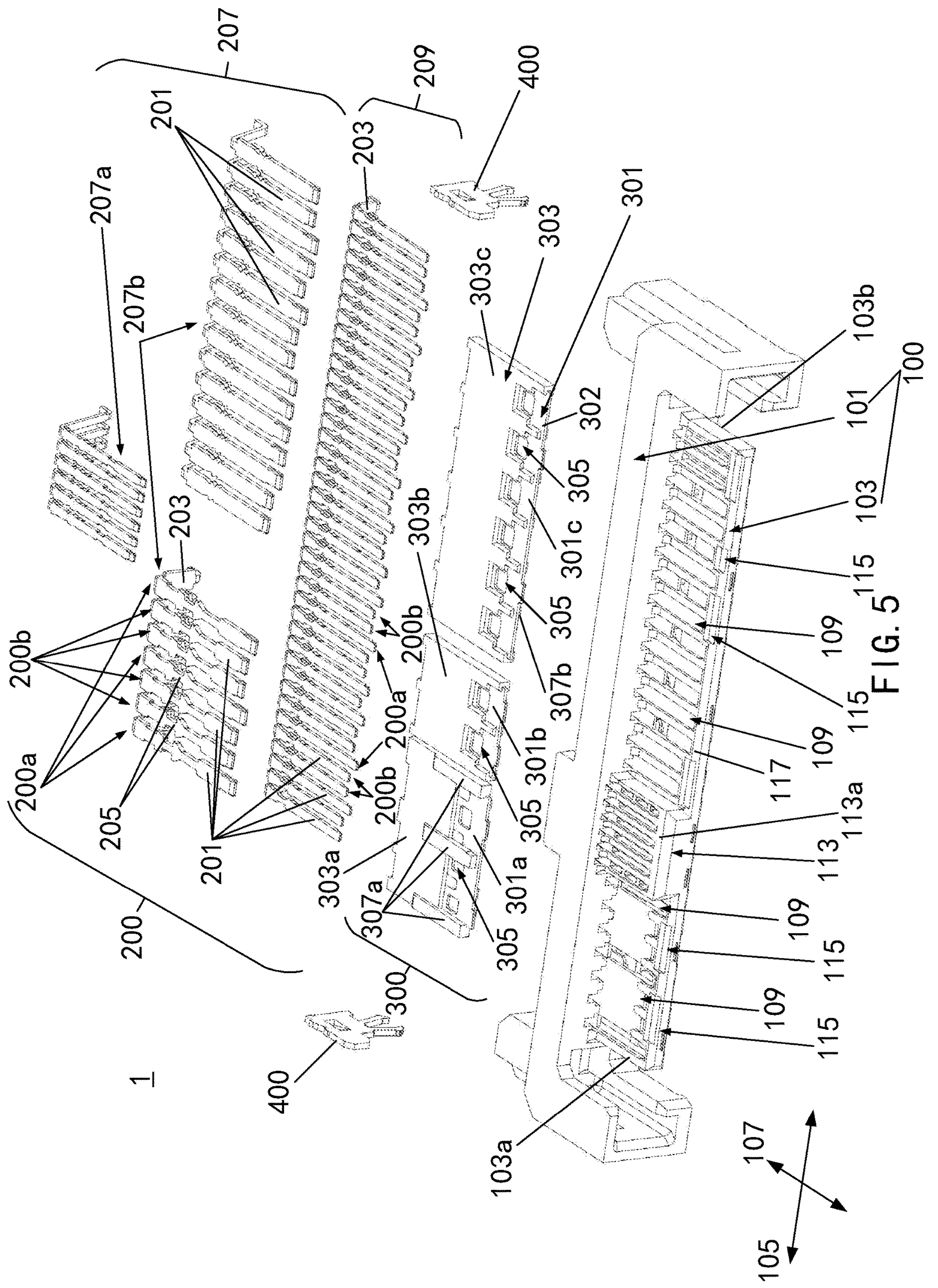
FIG. 5 is an exploded perspective view of the plug connector of FIG. 1.
Figure 6:
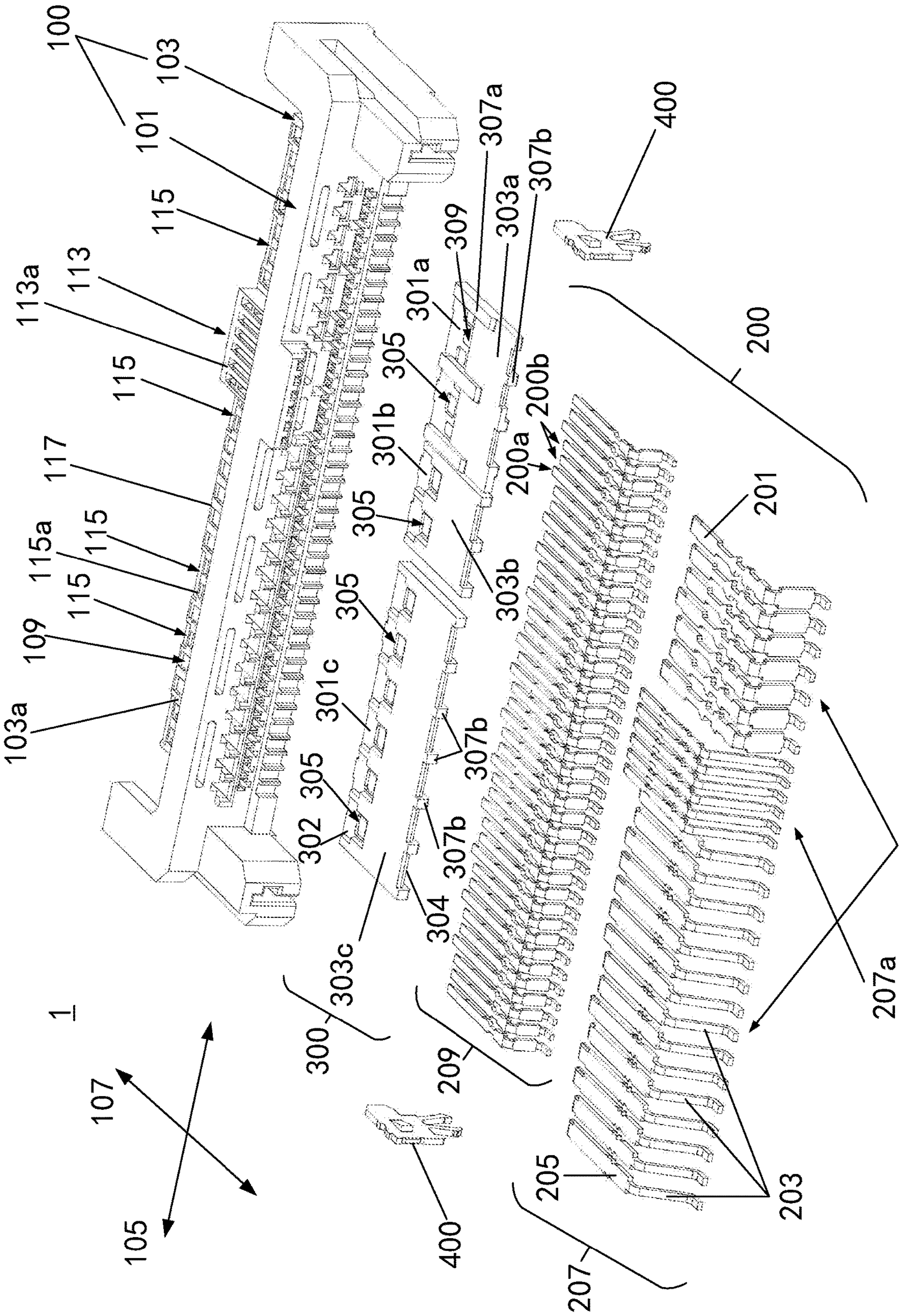
FIG. 6 is an exploded perspective view of the plug connector of FIG. 2.

As shown in FIGS. 1 to 3 and 5 to 9, the plug connector 1 further includes a plurality of conductive terminals 200. Each of the plurality of conductive terminals 200 is formed from a conductive material. The conductive material suitable for forming the terminals 200 may be a metal or metal alloy, such as a copper or copper alloy. With further reference to FIGS. 5 and 6, each conductive terminal 200 may include a mating portion 201, a tail portion 203, and an intermediate portion 205 extending between the mating portion 201 and the tail portion 203. The mating portion 201 may be configured to establish an electrical connection with a corresponding mating terminal (not shown) of the receptacle connector. In particular, when the plug connector 1 is mated with the receptacle connector, the mating portions of the corresponding mating terminals of the receptacle connector may resiliently press against the mating portions 201 of the conductive terminals 200 of the plug connector 1. The tail portion 203 may be configured to be mounted to a circuit board, and specifically attached to a conductive trace or other conductive structure on the circuit board, by utilizing any suitable technique such as a surface mount technology (SMT) and a pin immersion solder paste method (PiP). It should be appreciated that the present application is not limited thereto. The plurality of conductive terminals 200 may include ground terminals ("G") 200*a* and signal terminals ("S") 200*b*.

Figure 15:
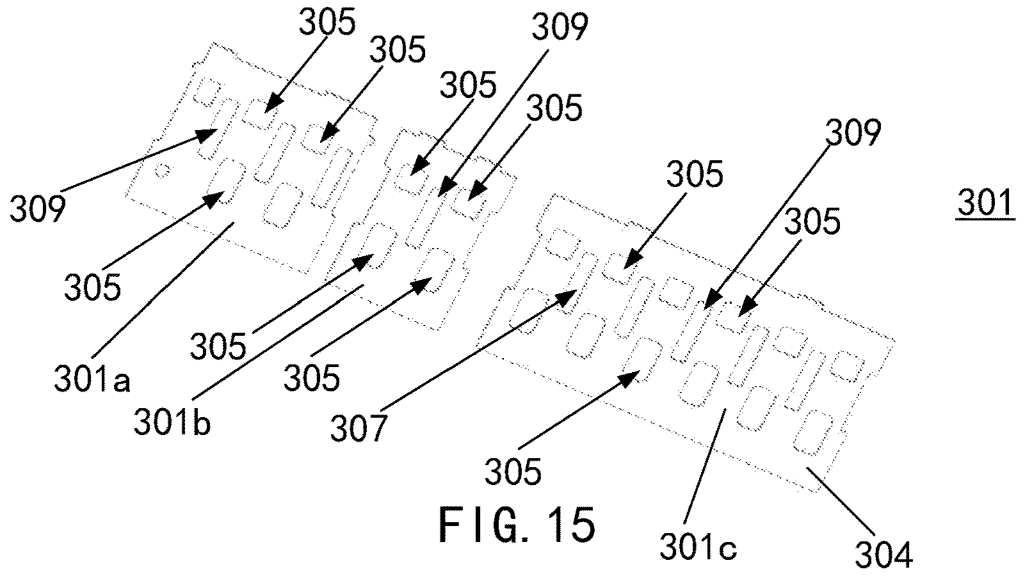
FIG. 15 is a perspective view of the conductive member of the shielding member of the plug connector of FIG. 1.
Figure 16:
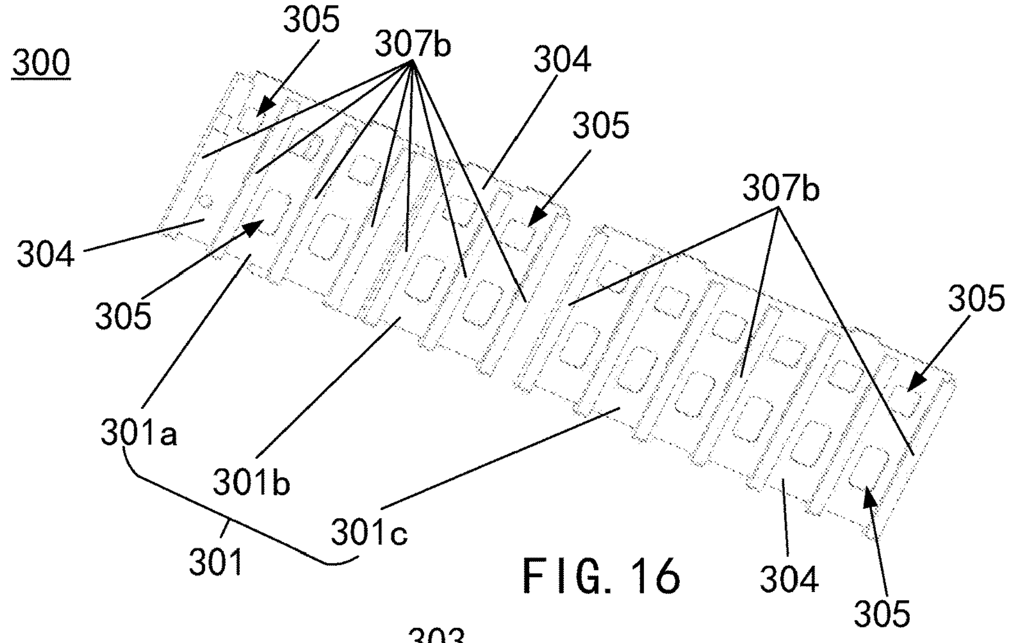
FIG. 16 is a bottom perspective view of the shielding member of the plug connector of FIG. 1, showing lossy material disposed on the conductive member.
Figure 17:
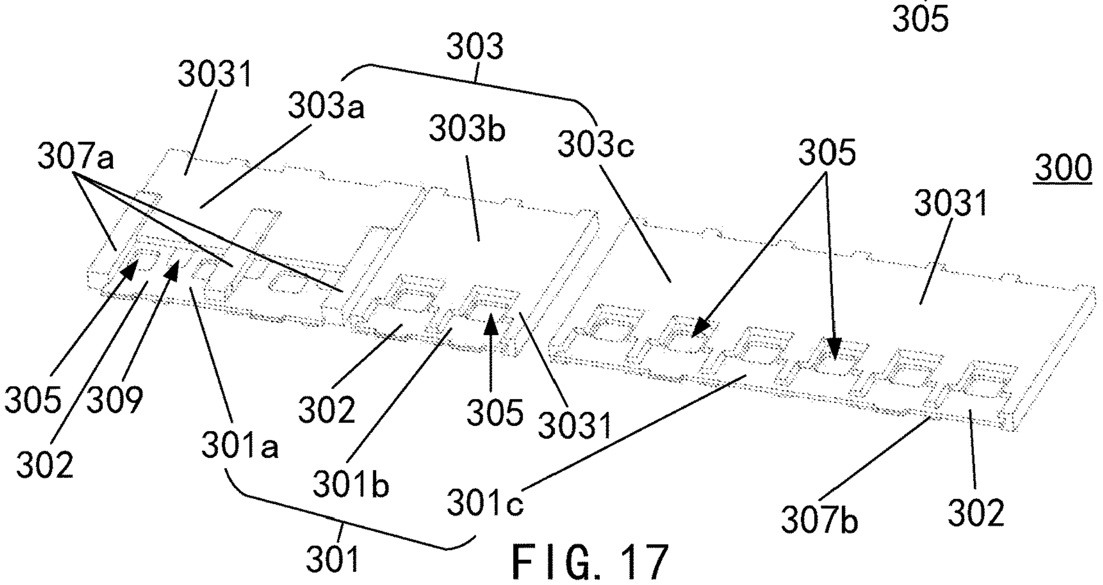
FIG. 17 is a top perspective view of the shielding member of FIG. 16.

As shown in FIGS. 4 to 6 and 10 to 12, the plug connector 1 further includes a shielding member 300 disposed in the insulative housing 100. The shielding member 300 includes a conductive member 301, and lossy material 303 disposed on the conductive member 301. With reference to FIGS. 15 to 17, the conductive member 301 is substantially planar and may be formed of a metal. The conductive member 301 includes a first surface 302 on a first side of two opposite sides, and a second surface 304 on a second side opposite to the first side. The conductive member 301 may be oriented parallelly to the mating direction 107 and to the longitudinal direction 105 in the insulative housing 100. With further reference to FIGS. 16 and 17, the lossy material 303 is selectively disposed on the conductive member 301. For example, the lossy material 303 may be overmolded on the conductive member 301. That is, the lossy material 303 may be a lossy material piece overmolded on the conductive member 301. It should be appreciated that the lossy material 303 may also be assembled to the conductive member 301 by any other suitable process. The insulative housing 100 may also be overmolded on the shielding member 300. That is, the insulative housing 100 may be an insulative material piece overmolded onto the shielding member 300. It should be appreciated that the shielding member 300 may also be assembled into the insulative housing 100 by any other suitable process. Overmolding the insulative housing 100 onto the shielding member 300 allows the integrity of the plug connector 1 to be improved. As will be described below, this can reduce the likelihood of the breakage of the tongue portion 103 from the base portion 101 during plugging and unplugging of the plug connector, thereby increasing the reliability and service life of the plug connector 1.

Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz. Alternatively, lossy material may be identified from measurements made at a single frequency, such as 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor that there is appreciable coupling to a ground conductor. Intimate contact is not a requirement for electrical coupling between lossy material and a conductor, as sufficient electrical coupling, such as capacitive coupling, between a lossy member and a conductor may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical lossy magnetic materials or mixtures containing lossy magnetic materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Figure 13:
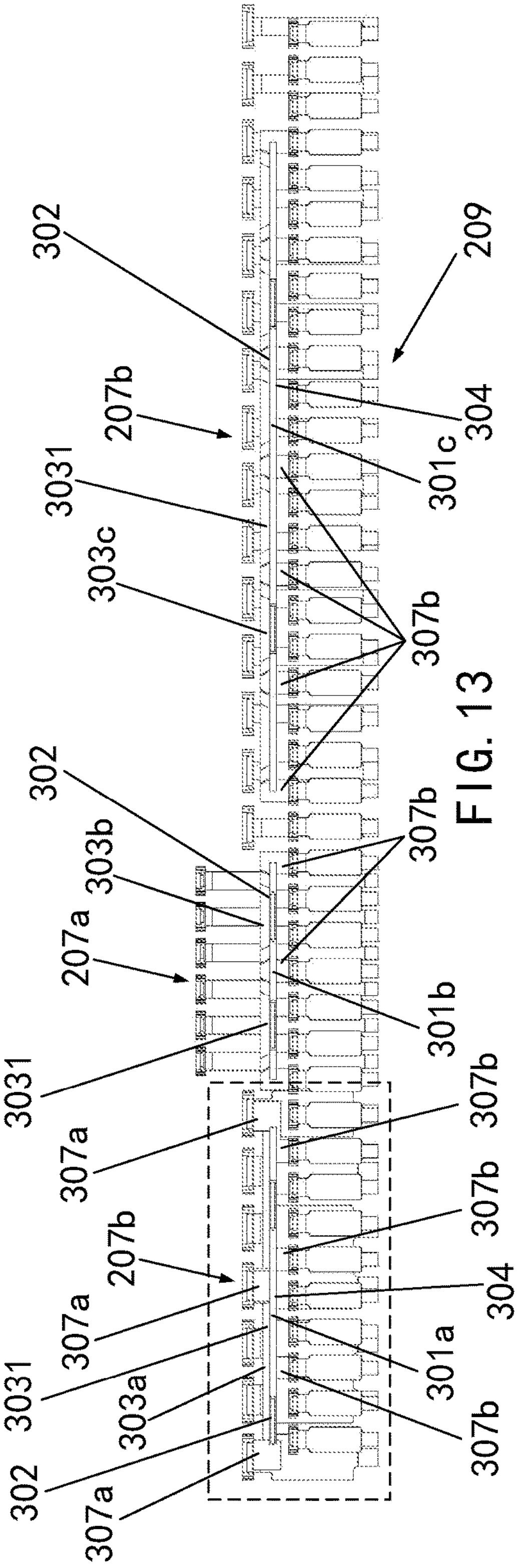
FIG. 13 is a front elevation view the plug connector of FIG. 1, with the insulative housing hidden to show the conductive terminals and a shielding member in the plug connector.
Figure 14:
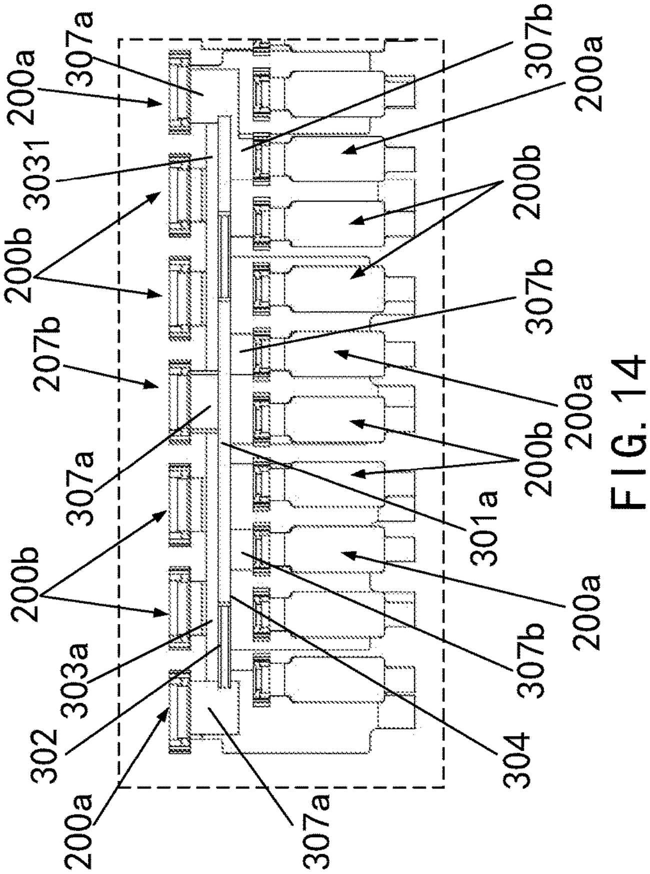
FIG. 14 is an enlarged view of the area circled by dashed lines in FIG. 13.

As shown in FIGS. 1 to 3 and 7 to 10, and as illustrated in FIGS. 13 and 14, the plurality of conductive terminals 200 are held on opposite sides of the shielding member 300 by the insulative housing 100 such that the mating portions 201 of the plurality of conductive terminals 200 are exposed through the two opposite outer surfaces (i.e., the first outer surface 103*a* and the second outer surface 103*b*) of the tongue portion 103, and the tail portions 203 of the plurality of conductive terminals 200 extend from a side of the base portion 101 opposite to the tongue portion 103. The lossy material 303 of the shield mechanism 300 is configured to electrically couple at least two of the ground terminals 200*a* together. In this way, it is possible to provide shielding between the conductive terminals 200 on the opposite sides of the shielding member 300 and to reduce crosstalk, improving signal integrity, thereby providing improved high frequency transmission performance for the plug connector 1.

With further reference to FIGS. 7 to 12, the mating portions 201 of the plurality of conductive terminals 200 are oriented in the mating direction 107 and the conductive member 301 extends at least in the tongue portion 103 of the insulative housing 100 in the mating direction 107.

With reference to FIGS. 5 and 6, the signal terminals 200*b* include at least one pair of signal terminals 200*b*. Each pair of the at least one pair of signal terminals 200*b* includes two adjacent signal terminals 200*b* and is configured as a differential signal pair for transmitting differential signals. In particular, a first signal terminal of each pair of signal terminals 200*b* may be energized by a first voltage, and a second signal terminal may be energized by a second voltage. The voltage difference between the first and second signal terminals represents a signal.

As shown in FIGS. 4 to 6, 10, and 15 to 17, the conductive member 301 may have at least one first opening 305. Each of the at least one first opening 305 extends through the conductive member 301 and at least partially overlaps with the mating portions 201 of a corresponding pair of the at least one pair of signal terminals 200*b*. The inventor has recognized that when the plug connector 1 is mated to the receptacle connector, the plug connector 1 and the receptacle connector define a mating contact portion (as schematically represented by the dashed square M in FIG. 7) on the tongue portion 103 along the mating direction 107. The mating contact portion may be defined, for example, as an area in which one or both of the ground terminals 200*a* and the signal terminals 200*b* of the plug connector 1 overlap with the corresponding mating terminals of the receptacle connector. The inventor has also recognized that when the total open area of the conductive member 301 increases, the impedance at the mating contact portion also increases. For example, if the conductive member 301 does not have any opening, its total open area is zero, the impedance at the mating contact portion is substantially lower than the expected impedance of the electrical connector assembly composed of the plug connector 1 and the receptacle connector, resulting in a mismatch of the impedance at the mating contact portion with respect to the expected impedance of the electrical connector assembly.

Configuring the at least one first opening 305 of the conductive member 301 to at least partially overlap with the mating portions 201 of the corresponding pair of the at least one pair of signal terminals 200*b* enables that the impedance at the mating contact portion can substantially match the expected impedance of the electrical connector assembly composed of the plug connector 1 and the receptacle connector and the crosstalk can be reduced when the plug connector 1 is mated with the receptacle connector. In some examples, the at least one first opening 305 is configured to completely overlap with the mating contact portion where the mating portions 201 of at least one pair of signal terminals 200*b* mate with the corresponding mating terminals of the receptacle connector when the plug connector 1 is plugged into the receptacle connector. In some examples, more than one first opening 305 may be disposed in the conductive member 301 along the mating portions 201 of a pair of signal terminals 200*b*. The area of each first opening 305 may be reduced to reduce crosstalk at the mating contact portion. For example, when the plug connector 1 is mated with the receptacle connector, the area of each first opening 305 may be smaller than the wavelength of the signal transmitted across the signal terminals 200*b* of the plug connector 1 and the corresponding mating terminals of the receptacle connector. The area of the first openings 305 may be reduced as the frequency of the signal transmitted across the signal terminals 200*b* and the corresponding mating terminals increases. Thus, the number and area of the first openings 305 and the total open area of the conductive member 301 may be configured to match the impedance at the mating contact portion substantially with the expected impedance of the electrical connector assembly and to reduce crosstalk.

Figure 10:
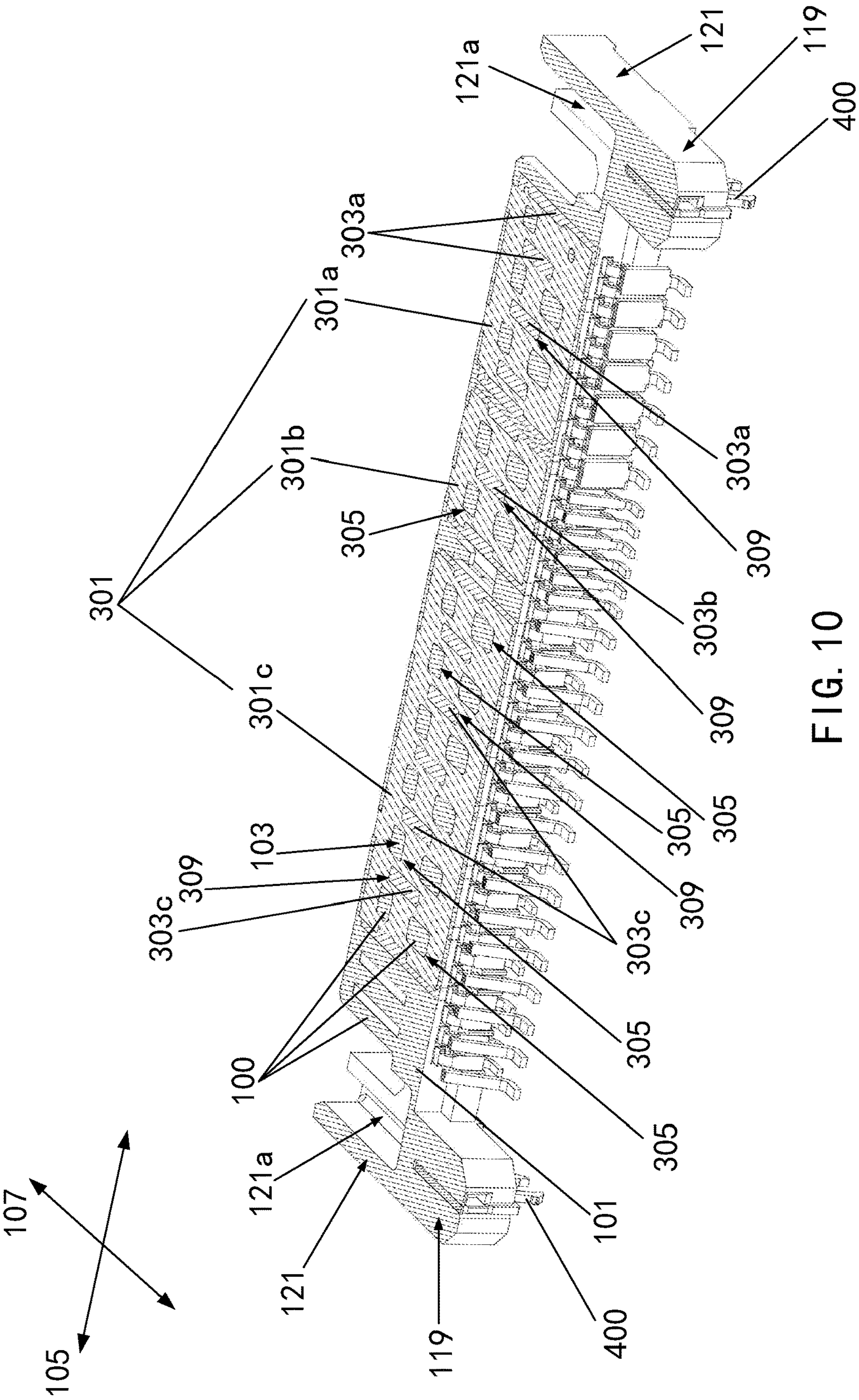
FIG. 10 is a cross-sectional perspective view of the plug connector of FIG. 2.

In some examples, as shown in FIGS. 10, 16, and 17, the lossy material 303 does not overlap with the at least one first openings 305. The insulative housing 100 may completely fill the at least one first opening 305. This assists in securing the conductive member 301 in the insulative housing 100, and therefore assists in securing the shielding member 300 in the insulative housing 100. In some other examples, the insulative housing 100 may not overlap with the at least one first opening 305.

Turning back to FIGS. 5 and 6, the at least one pair of signal terminals 200*b* may be a plurality of pairs of signal terminals 200*b*. At least two ground terminals 200*a* may be arranged adjacent to each pair of signal terminals 200*b* to separate each pair of the plurality of pairs of signal terminals 200*b* from each other to reduce crosstalk between signals, thereby improving signal integrity. For example, these terminals may be arranged in a "G-S-S-G-S-S . . . G-S-S-G" pattern, with each pair of signal terminals 200*b* sharing a ground terminal 200*a*. It should be appreciated that the plurality of conductive terminals 200 may also include other conductive terminals. These other conductive terminals may be the same as or similar to (e.g., having different dimensions from those of) the ground terminal 200*a* and the signal terminal 200*b*, and/or may include power terminals for transmitting power. It is noted that although the ground terminals are identified as 200*a*, and the signal terminals are identified as 200*b* among the accompanying drawings, this does not mean that the terminals are limited to having identical dimensions.

As described above, each of the plurality of conductive terminals 200 further includes an intermediate portion 205 extending between the mating portion 201 and the tail portion 203. The intermediate portion 205 is held in the base portion 101 of the insulative housing 100, as shown in FIGS. 1 to 3 and 10 to 12. The conductive member 301 may extend in the mating direction 107 along substantially the entire length of the mating portions 201 and the intermediate portions 205 of the signal terminals 200*b* and the ground terminals 200*a*. As used herein, the term "substantially" means, for example, most, or almost all, or all, or an amount in the range of about 80% to about 100%. In addition, an extending range of the conductive member 301 in the longitudinal direction 105 at least overlaps with the signal terminals 200*b* and the ground terminals 200*a*. In some examples, the extending range of the conductive member 301 in the longitudinal direction 105 may overlap with all of the conductive terminals 200.

In some examples, as shown in FIGS. 5 to 6, 11 to 14, and 16 to 17, the lossy material 303 includes at least two protrusions (identified as "307*a*" and "307*b*" in the appended drawings) protruding from the conductive member 301 and extending towards the aforementioned at least two ground terminals 200*a*. As shown in FIGS. 5 and 6, each protrusion is elongated in the mating direction 107. The lossy material 303 is electrically coupled to a corresponding one of the aforementioned at least two ground terminals 200*a* through each of the at least two protrusions. Electrically coupling the lossy material 303 to the ground terminals 200*a* allows the effect of electrical resonance to be reduced, thereby improving signal integrity. In particular, when the electrical resonance occurs at a frequency within the operating frequency range of the plug connector 1, the integrity of the high-speed signal passing through the plug connector 1 deteriorates. The deterioration in the integrity of the signal passing through the plug connector 1 is partially caused by the loss of signal energy coupled into the resonant signal, which means that less signal energy passes through the plug connector 1. The deterioration in the integrity of the signal passing through the plug connector 1 is also partially caused by the coupling of the resonant signal from the ground terminals 200*a* to the signal terminals 200*b*. The resonant signal accumulates and possesses a high amplitude, so that when the resonant signal is coupled from the ground terminals 200*a* to the signal terminals 200*b*, it will generate a large amount of noise that interferes with the signal. Sometimes, the resonant signal coupled to the signal terminals 200*b* is also referred to as crosstalk. The frequency at which electrical resonance occurs is related to the length of the ground terminals supporting the electrical resonance, the reason is that the wavelength of the resonant signal is related to the length of the ground terminals supporting the resonance, and the frequency is inversely related to the wavelength. Electrically coupling the lossy material 303 to the ground terminals 200*a* may enable energy coupled into the ground terminals 200*a* and accumulated into a resonant signal to be dissipated in the lossy material 303, which makes the occurrence of electrical resonance less likely, thereby increasing signal integrity and improving the operating frequency range of the plug connector 1.

Figure 11:
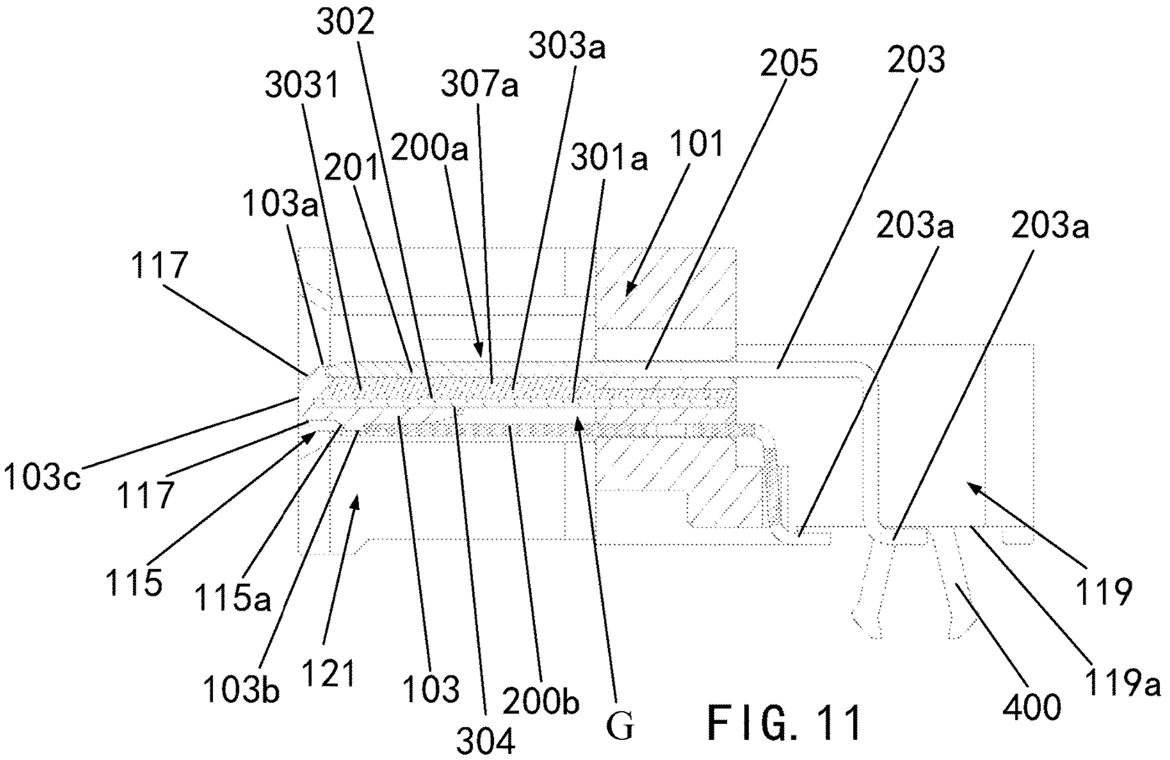
FIG. 11 is a cross-sectional view of the plug connector of FIG. 1 taken along line I-I in FIG. 8.

Each of the at least two protrusions of the lossy material 303 is electrically coupled to at least a mating portion 201 of a corresponding one of the aforementioned at least two ground terminals 200*a*. In some examples, as shown in FIG. 11, the protrusions of the lossy material 303 (identified by "307*a*") may be only electrically coupled to the mating portions 201 of the corresponding ground terminals 200*a*. In some other examples, the protrusions of the lossy material 303 may be electrically coupled to the intermediate portions 205 and the mating portions 201 of the corresponding ground terminals 200*a*. It should be appreciated that the protrusions of the lossy material 303 may also be only electrically coupled to the intermediate portions 205 of the corresponding ground terminals 200*a*. The extent to which the protrusions of the lossy material 303 is electrically coupled to the corresponding ground terminals 200*a* may be determined to both reduce crosstalk between adjacent signals and balance impedance along conductive paths.

In some examples, the protrusions of the lossy material 303 may be in direct contact with the corresponding ground terminal 200*a* to enable electrical coupling. As shown in FIGS. 5 and 11, the tongue portion 103 includes a plurality of terminal slots 109 recessed into the tongue portion 103 from the two opposite outer surfaces (i.e., the first outer surface 103*a* and the second outer surface 103*b*) thereof. The mating portion 201 of each of the plurality of conductive terminals 200 is received in a corresponding one of the plurality of terminal slots 109. At least a portion of the protrusions of the lossy material 303 may be exposed at a bottom of a corresponding one of the plurality of terminal slots 109 to be in direct contact with the mating portion 201 of a corresponding one of the ground terminals 200*a*. In addition, a portion of the protrusion of the lossy material 303 may be in direct contact with the intermediate portion 205 of a corresponding one of the ground terminals 200*a* in the base portion 101. In some other examples, the protrusion of the lossy material 303 may be disposed sufficiently close to the corresponding ground terminal 200*a* to capacitively couple with the corresponding ground terminal 200*a*, thereby enable electrical coupling. In such examples, a gap exists between the protrusion and the corresponding ground terminal 200*a*. In an optional example, the gap may be filled by the insulative housing 100 such that the protrusion may be separated from the corresponding ground terminal 200*a* by the insulative housing 100.

As shown in FIGS. 1 to 14, the plurality of conductive terminals 200 are arranged in a first group of conductive terminals 207 and a second group of conductive terminals 209 along the longitudinal direction 105 on the opposite sides of the shielding member 300. Each of the first outer surface 103*a* and the second outer surface 103*b* of the tongue portion 103 of the insulative housing 100 is parallel to the longitudinal direction 105 and to the mating direction 107. The mating portion 201 of each conductive terminal of the first group of conductive terminals 207 is exposed through the first outer surface 103*a* and oriented in the mating direction 107, and the mating portion 201 of each conductive terminal of the second group of conductive terminals 209 is exposed through the second outer surface 103*b* and oriented in the mating direction 107.

It should be appreciated that at least one group of the first group of conductive terminals 207 and the second group of conductive terminals 209 may include ground terminals 200*a* and a plurality of pairs of signal terminals 200*b*, wherein each pair of the plurality of pairs of signal terminals 200*b* is configured as a differential signal pair and the ground terminals 200*a* separate each pair of the plurality of pairs of signal terminals 200*b* from each other. In this case, the lossy material 303 may be electrically coupled to a corresponding ground terminal 200*a* of the ground terminals 200*a* through each of the at least two protrusions.

In some examples, as shown in FIGS. 1 to 14, each group of the first group of conductive terminals 207 and the second group of conductive terminals 209 includes ground terminals 200*a* and a plurality of pairs of signal terminals 200*b*, wherein each pair of the plurality of pairs of signal terminals 200*b* is configured as a differential signal pair and the ground terminals 200*a* separate each pair of the plurality of pairs of signal terminals 200*b* from each other. As shown in FIGS. 5 to 6, 13 to 14, and 16 to 17, at least two protrusions of the lossy material 303 include a plurality of first protrusions 307*a* extending towards the ground terminals 200*a* in the first group of conductive terminals 207, and a plurality of second protrusions 307*b* extending towards the ground terminals 200*a* in the second group of conductive terminals 209. Each of the plurality of first protrusions 307*a* is electrically coupled to a corresponding one of the ground terminals 200*a* in the first group of conductive terminals 207, and each of the plurality of second protrusions 307*b* is electrically coupled to a corresponding one of the ground terminals 200*a* in the second group of conductive terminals 209. In an optional example, the plurality of first protrusions 307*a* may be offset from the plurality of second protrusions 307*b* in the longitudinal direction 105. In other words, the plurality of first protrusions 307*a* may not be aligned with the plurality of second protrusions 307*b* in the longitudinal direction 105. Through providing the plurality of first protrusions 307*a* to be offset from the plurality of second protrusions 307*b* in the longitudinal direction 105, it is possible to allow for an offset between the conductive terminals 200 of the first group of conductive terminals 207 and the second group of conductive terminals 209, so as to further reduce crosstalk between the first group of conductive terminals 207 and the second group of conductive terminals 209, thereby further improving signal integrity.

In some other examples, only one group of the first group of conductive terminals 207 and the second group of conductive terminals 209 includes ground terminals 200*a* and a plurality of pairs of signal terminals 200*b*, wherein each pair of the plurality of pairs of signal terminals 200*b* is configured as a differential signal pair, and the ground terminals 200*a* separate each pair of the plurality of pairs of signal terminals 200*b* from each other. In this case, at least two protrusions of the lossy material 303 only include a plurality of protrusions (e.g., only including a first protrusion 307*a* or a second protrusion 307*b*) extending towards the ground terminal 200*a* in the aforementioned one group to electrically couple to the ground terminal 200*a*.

In some examples, as shown in FIGS. 13 to 14 and 17, the lossy material 303 includes a first portion 3031 disposed on the first surface 302 of the conductive member 301. The first portion 3031 may be separated from the first group of conductive terminals 207 by an insulating material, and the insulating material may be the insulating material forming the insulating housing 100. As shown, the aforementioned plurality of first protrusions 307*a* are protrusions protruding from the main planar surface of the first portion 3031.

Figure 4:
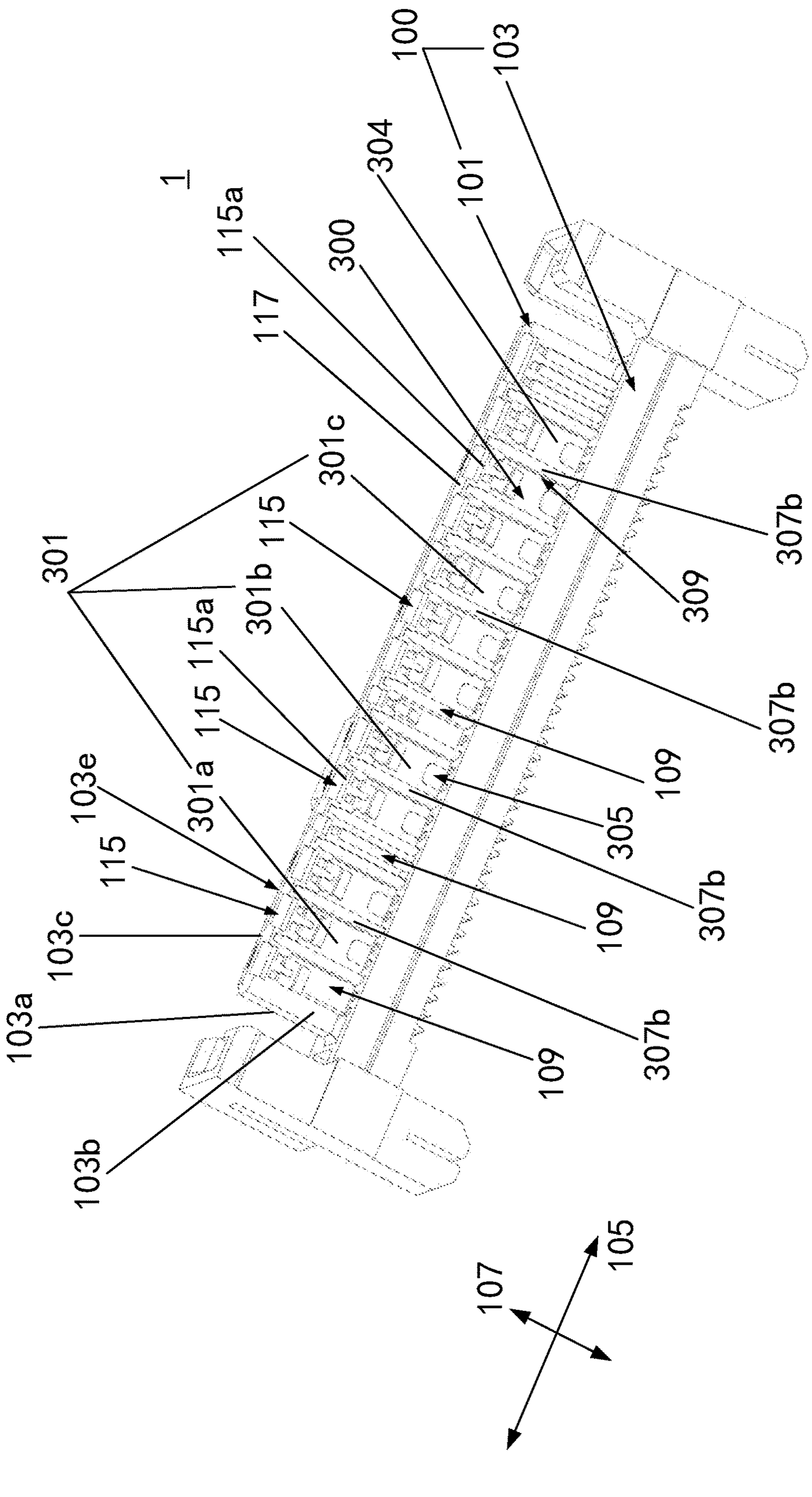
FIG. 4 is a bottom perspective view of the plug connector of FIG. 1, with the conductive terminals hidden.
Figure 12:
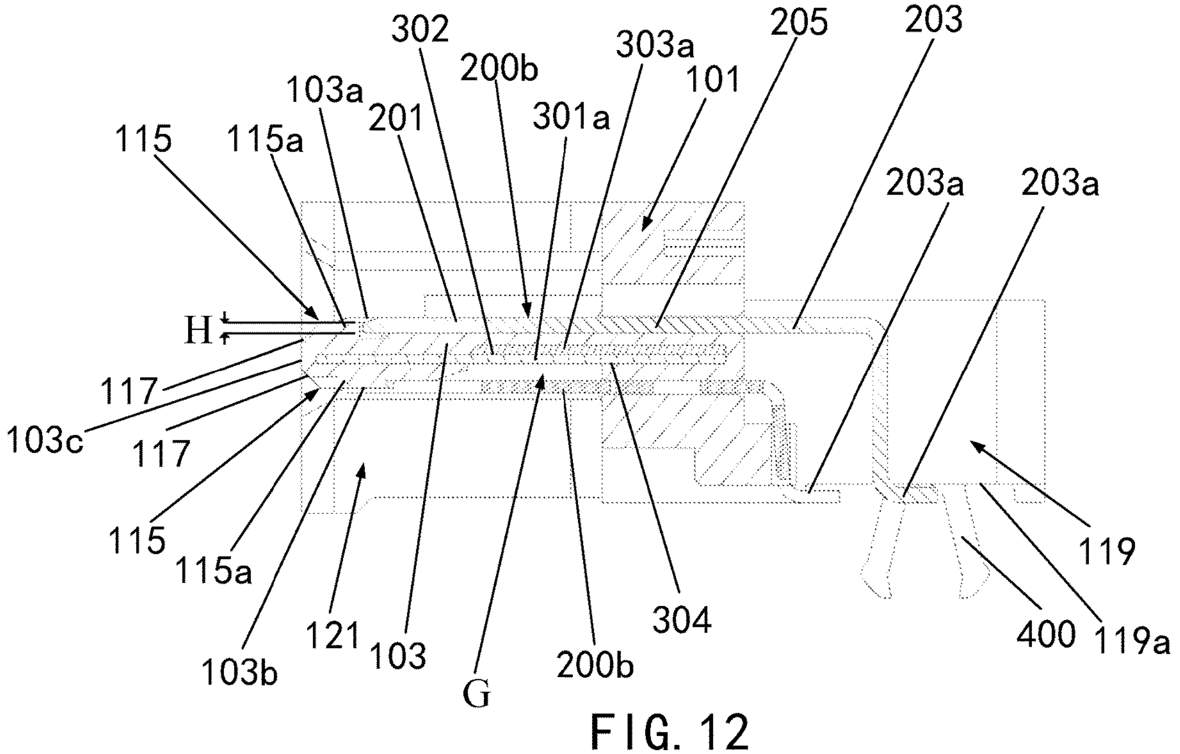
FIG. 12 is a cross-sectional view of the plug connector in FIG. 1 taken along line II-II in FIG. 8.

In some examples, as shown in FIG. 16, the lossy material 303 includes a plurality of protrusions (as indicated by "307*b*") extending from the second surface 304 of the conductive member 301. Each of the plurality of protrusions contacts a corresponding one of the at least two ground terminals 200*a*. In one of these examples, as shown in FIG. 4, the second surface 304 of the conductive member 301 is at least partially exposed in the terminal slots 109. The signal terminals 200*b* in the second group of conductive terminals 209 include a first plurality of differential signal pairs disposed between the ground terminals 200*a*. Each signal terminal 200*b* of the first plurality of differential signal pairs includes a portion separated from the conductive member 301 by air (as indicated schematically by "G" in FIGS. 11 and 12). In addition, the signal terminals 200*b* in the first group of conductive terminals 207 include a second plurality of differential signal pairs, and each signal terminal 200*b* of the second plurality of differential signal pairs is separated from the conductive member 301 by the insulative housing 300, as shown in FIG. 12. It should be appreciated that the aforementioned first plurality of differential signal pairs and the second plurality of differential signal pairs are held on the opposite sides of the shielding member 300, respectively, wherein the mating portion 201 of each signal terminal 200*b* in the first plurality of differential signal pairs is exposed through the second outer surface 103*b* of the tongue portion 103, and the mating portion 201 of each signal terminal 200*b* in the second plurality of differential signals is exposed through the first outer surface 103*a* of the tongue portion 103. The first plurality of differential signal pairs may be configured according to PCIe, and the second plurality of differential signal pairs may be configured according to SAS/SATA/SATA Express.

It should be appreciated that the shield mechanism 300 may be closer to one of the first group of conductive terminals 207 and the second group of conductive terminals 209 compared to the other of the first group of conductive terminals 207 and the second group of conductive terminals 209. In some examples, as shown in FIGS. 13 to 14 and FIG. 17, the lossy material 303 includes a first portion 3031 disposed on a first surface 302 of the conductive member 301 such that the shielding member 300 is closer to the first group of conductive terminals 207. In some other examples, depending on the performance and needs, the shielding member 300 may be closer to the second group of conductive terminals 209.

In some examples, as shown in FIG. 1 and FIGS. 5 to 8, the tongue portion 103 further includes a first platform 113 protruding from the first outer surface 103*a* of the tongue portion 103. The first platform 113 may have a first platform surface 113*a* parallel to the first outer surface 103*a*. It should be appreciated that the first platform surface 113*a* may also be considered as part of the first outer surface 103*a*. The first group of conductive terminals 207 includes a first subgroup of conductive terminals 207*a* and a second subgroup of conductive terminals 207*b*. The mating portion 201 of each conductive terminal 200 of the first subgroup of conductive terminals 207*a* is exposed through the first platform surface 113*a* and is oriented in the mating direction 107. The conductive terminals 200 in the first subgroup of conductive terminals 207*a* and the conductive terminals 200 in the second subgroup of conductive terminals 207*b* are each aligned in the longitudinal direction 105. The conductive terminals 200 of the second group of conductive terminals 209 are aligned in the longitudinal direction 105. The first platform 113 may provide a dummy-proof function to prevent the plug connector 1 from being plugged into the receptacle connector in a wrong orientation, either intentionally or unintentionally.

Referring to FIGS. 10, 15 and 17, the conductive member 301 may further define at least one second opening 309 extending through the conductive member 301. The lossy material 303 extends from a first side of the conductive member 301 through the at least one second opening 309 to a second side of the conductive member 301 opposite to the first side. In this way, portions of the lossy material 303 on the first side and the second side of the conductive member 301 may be joined together. The lossy material 303 may be reliably secured to the conductive member 301 through extending through the at least one second opening 309. The at least one second opening 309 does not overlap with the at least one first opening 305. In some examples, the at least one second opening 309 at least partially overlaps with the region where the lossy material 303 is electrically coupled to the at least two ground terminals 200*a*.

In some examples, as shown in FIGS. 4 to 6, 10, 13, and 15 to 17, the conductive member 301 may include a plurality of conductive member sections, which are shown as three conductive member sections 301*a*, 301*b*, and 301*c*. Accordingly, the lossy material 303 may also include a plurality of lossy material sections, which are shown as three lossy material sections 303*a*, 303*b*, and 303*c*. Each of the plurality of lossy material sections 303*a*, 303*b*, and 303*c* is disposed on a corresponding one of the plurality of conductive member sections 301*a*, 301*b*, and 301*c*. It should be appreciated that, in some other examples, the conductive member 301 may be a single integral piece of conductive member, and accordingly, the lossy material 303 is a single integral piece of lossy material disposed on the conductive member 301.

As described above, the plug connector 1 is configured to be plugged into the receptacle connector (not shown). In particular, the plug connector 1 is configured to be plugged into the receptacle connector along the mating direction 107 such that the mating portions 201 of the signal terminals 200*b* contact the first mating terminals (not shown) of the receptacle connector, and the mating portions 201 of the ground terminals 200*a* contact the second mating terminals (not shown) of the receptacle connector. As shown in FIGS. 1 to 3, 7, and 9, the mating portions 201 of the plurality of conductive terminals 200 extend away from the base portion 101 in the mating direction 107 at the two opposite outer surfaces of the tongue portion 103, wherein the mating portions 201 of the signal terminal 200*b* extend by a shorter length than the mating portions 201 of the ground terminals 200*a*. A section of the edge portion of the tongue portion 103 corresponding to the mating portion 201 of the signal terminal 200*b* in the mating direction 107 is formed with a recessed portion 115. The recessed portion 115 is configured to receive the first mating terminal of the receptacle connector, when the plug connector 1 is plugged into the receptacle connector, such that the first and second mating terminals of the receptacle connector can touch with the tongue portion 103 of the plug connector 1 in sequence. In this way, it is possible to reduce the insertion force during an initial plugging stage of plugging the plug connector 1 into the receptacle connector, thereby prolonging the time for the insertion force to rise and thereby reducing the risk of damaging to the terminals due to the rise of the insertion force.

As shown in FIGS. 1 to 9 and 11 to 12, the tongue portion 103 includes a third outer surface 103*c* facing away from the base portion 101 in the mating direction 107 and connecting the first outer surface 103*a* with the second outer surface 103*b*. The aforementioned edge portion is at least one of a first edge portion 103*d* connecting the first outer surface 103*a* with the third outer surface 103*c* and a second edge portion 103*d* connecting the second outer surface 103*b* with the third outer surface 103*c*.

In some examples, as shown in FIGS. 1 to 9 and 11 to 12, the edge portion of the tongue portion 103 may be formed with a first guiding surface 117 to guide the second mating terminals of the receptacle connector to slide onto the tongue portion 103 before the first mating terminals of the receptacle connector enters the recessed portion 115. In this case, the recessed portion 115 may be recessed into the tongue portion 103 towards the base portion 101 in the mating direction 107 from the first guiding surface 117. As illustrated in FIGS. 11 and 12, the recessed portion 115 extends towards the base portion 101 in the mating direction 107 to terminate at the second guiding surface 115*a*. The second guiding surface 115*a* is configured to guide the first mating terminals of the receptacle connector to slide onto the tongue portion 103. At least one of the first guiding surface 117 and the second guiding surface 115*a* is beveled. In this case, at least one of the first guiding surface 117 and the second guiding surface 115*a* may be inclined at an angle of 10° to 45° relative to the mating direction 107. In some examples, the projection of the first guiding surface 117 in the mating direction 107 does not overlap with the projection of the second guiding surface 115*a* in the mating direction 107, thereby ensuring that the first mating terminals and the second mating terminals touch with the tongue portion 103 in sequence.

With further reference to FIGS. 11 and 12, a distance H by which the recessed portion 115 is recessed into the tongue portion 103 relative to a corresponding outer surface of the first outer surface 103*a* and the second outer surface 103*b* of the tongue portion 103 is configured to reduce or even avoid the friction of the tongue portion 103 against the first mating terminals of the receptacle connector. The distance by which the recessed portion 115 is recessed into the tongue portion 103 in the mating direction 107 (i.e., from the third outer surface 103*c*) may be equal to the difference between the length by which the mating portion 201 of the ground terminal 200*a* extends and the length by which the mating portion 201 of the signal terminal 200*b* extends. It should be appreciated that, depending on different needs and conditions (e.g., the configuration of the first mating terminals), the recessed portion 115 may be recessed into the tongue portion 103 by any other suitable distance in the mating direction 107, for example, by a distance greater than or less than the difference between the length by which the mating portion 201 of the ground terminal 200*a* extends and the length by which the mating portion 201 of the signal terminal 200*b* extends.

Figure 7:
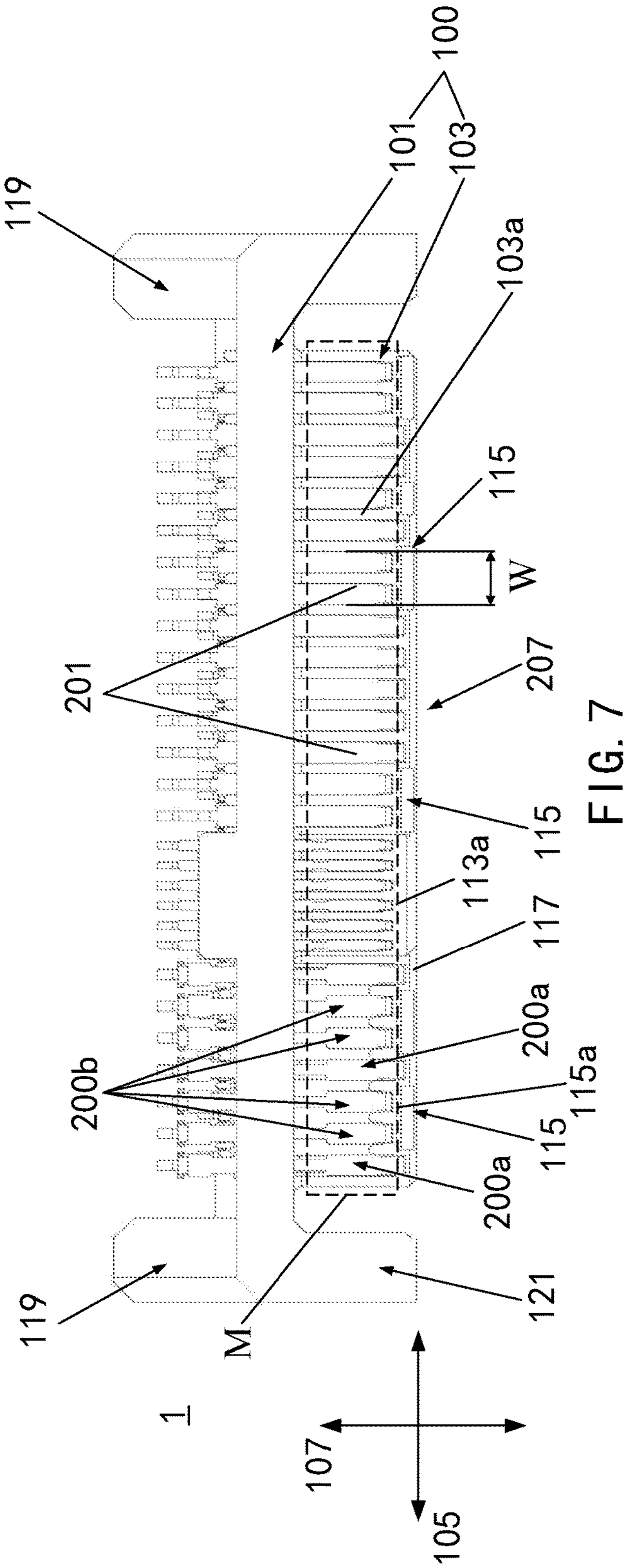
FIG. 7 is a top plan view of the plug connector of FIG. 1.
Figure 8:
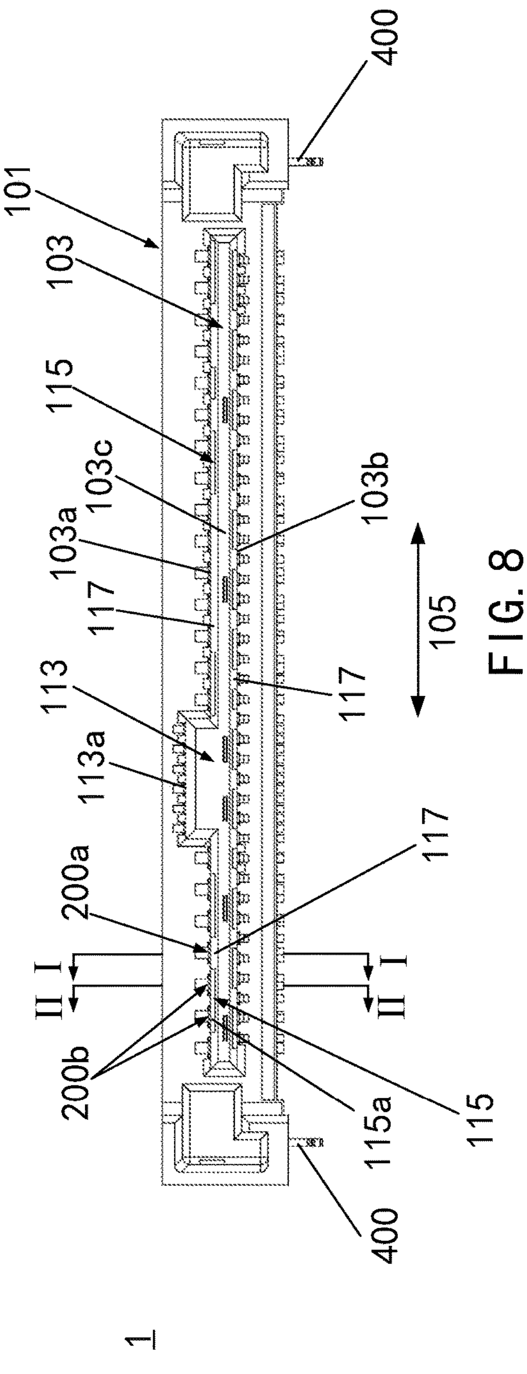
FIG. 8 is a front elevation view of the plug connector of FIG. 1.
Figure 9:
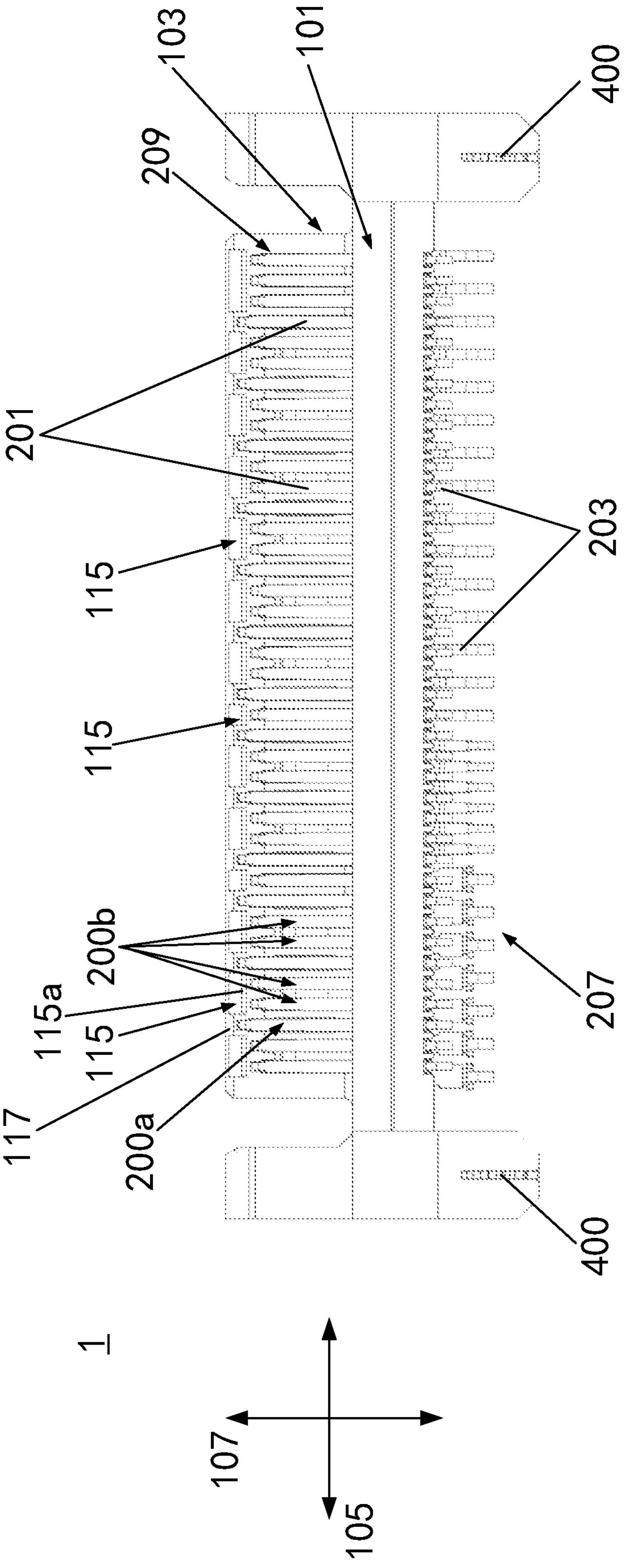
FIG. 9 is a bottom plan view of the plug connector of FIG. 1.

Furthermore, as shown in FIG. 7, two adjacent signal terminals 200*b* define a transverse width W. This transverse width W equals to the sum of the widths of the two adjacent signal terminals 200*b* and the spacing between the two adjacent signal terminals 200*b*. A recessed portion 115 of the recessed portion 115 corresponding to the pair of signal terminals 200*b* may have a width greater than or equal to the transverse width W in the direction along the edge portion (e.g., longitudinal direction 105). It should be appreciated that, depending on different needs and conditions (e.g., the configuration of the first mating terminals), the one of the recessed portion 115 corresponding to the pair of signal terminals 200*b* may have any other suitable width in the direction along the edge portion, such as a width less than the transverse width W.

In some examples, as shown in FIGS. 1 to 10, the insulative housing 100 may further include at least one mounting portion 119 (shown as two in the drawings) extending from the base portion 101 in the mating direction 107 opposite to the tongue portion 103. Each of the at least one mounting portion 119 has a mounting surface 119*a* configured to be mounted to a circuit board (not shown), the mounting surface 119*a* is flush with the surfaces (not shown) of an end segment 203*a* of the tail portion 203 of each conductive terminal 200 of the first group of conductive terminals 207 and an end segment 203*a* of the tail portion 203 of each conductive terminal 200 of the second group of conductive terminals 209 facing towards a mounting direction perpendicular to the mating direction 107 and to the longitudinal direction 105. It should be appreciated that in some other examples, the plug connector 1 may be configured such that the mounting direction is parallel to the mating direction 107.

In some examples, shown in FIGS. 1 to 10, the insulative housing 100 may further include a board lock receiving feature 119*b* disposed at at least one mounting portion 119 for receiving a board lock 400. The board lock 400 may be used to reliably secure the plug connector 1 on a circuit board. The board lock 400 is shown in the form of a latching piece, however, it should be appreciated that the present application is not limited thereto.

In some examples, as shown in FIGS. 1 to 10, the insulative housing 100 may further include at least one receiving portion 121 (shown as two in the drawings) extending parallel to the tongue portion 103 from the base portion 101 along the mating direction 107. Each of the at least one receiving portion 121 has a receiving slot 121*a* configured to receive a corresponding portion (not shown) of the receptacle connector to guide the plug connector 1 to mate with the receptacle connector.

It should also be appreciated that the terms "first", "second" and "third" are used to distinguish an element or component from another element or component, and that these elements and/or components may not be limited by the terms.

The present application has been described in detail in conjunction with specific embodiments. The above description and the embodiments shown in the appended drawings should be understood to be exemplary and do not constitute a limitation to the present application. For a person skilled in the art, various variations or modifications can be made without departing from the spirit of the present application, and these variations or modifications fall within the scope of the present application.

What is claimed is:

1. A plug connector, comprising:

an insulative housing comprising a base portion and a tongue portion extending from the base portion;

a shielding member disposed in the insulative housing, the shielding member comprising a conductive member and lossy material disposed on the conductive member; and a plurality of conductive terminals held on opposite sides of the shielding member by the insulative housing such that mating portions of the plurality of conductive terminals are exposed through two opposite outer surfaces of the tongue portion and tail portions of the plurality of conductive terminals extend from a side of the base portion opposite to the tongue portion, the plurality of conductive terminals comprising signal terminals and ground terminals, wherein;

the lossy material is configured to electrically couple at least two of the ground terminals together;

the conductive member comprises a first surface on a first side of the opposite sides and a second surface on a second side of the opposite sides;

the lossy material comprises a plurality of protrusions extending from the second surface of the conductive member; and each of the plurality of protrusions contacts a corresponding one of the ground terminals.

2. The plug connector of claim 1, wherein:

the plurality of conductive terminals are arranged in a first group of conductive terminals and a second group of conductive terminals on the opposite sides;.

3. The plug connector of claim 2, wherein:

the insulative housing comprises terminal slots for holding the plurality of conductive terminals; and the second surface of the conductive member is at least partially exposed in the terminal slots.

4. The plug connector of claim 3, wherein:

the signal terminals comprise a first plurality of differential signal pairs disposed on the second side of the opposite sides of the conductive member and between ground terminals; and each signal terminal of the first plurality of differential signal pairs comprises a portion separated from the conductive member by air.

5. The plug connector of claim 4, wherein:

the signal terminals further comprise a second plurality of differential signal pairs disposed on the first side of the opposite sides of the conductive member and between ground terminals;

each signal terminal of the second plurality of differential signal pairs is separated from the conductive member by one of the two opposite outer surfaces of the tongue portion on the first side of the opposite sides of the conductive member;

the first plurality of differential signal pairs are configured according to PCle; and the second plurality of differential signal pairs are configured according to SAS/SATA/SATA Express.

6. The plug connector of claim 5, wherein the shielding member is closer to the second group of conductive terminals than the first group of conductive terminals.

7. The plug connector of claim 1, wherein:

the tongue portion extends from the base portion in a mating direction;

the mating portions of the plurality of conductive terminals are oriented in the mating direction; and the conductive member extends at least in the tongue portion in the mating direction.

8. The plug connector of claim 1, wherein:

the signal terminals comprise at least one pair of signal terminals;

each pair of the at least one pair of signal terminals is configured as a differential signal pair;
the conductive member comprises at least one first opening; and
each of the at least one first opening extends through the conductive member and at least partially overlaps with the mating portions of a corresponding pair of the at least one pair of signal terminals.

9. The plug connector of claim 8, wherein:
the plug connector is configured to be plugged into a receptacle connector such that the mating portions of the at least one pair of signal terminals mate with corresponding terminals of the receptacle connector; and
the at least one first opening is configured to overlap with a mating contact portion where the mating portions of the at least one pair of signal terminals mate with the corresponding terminals of the receptacle connector.

10. The plug connector of claim 9, wherein:
the insulative housing comprises portions disposed in the at least one first opening.

11. A plug connector, comprising:
an insulative housing comprising a base portion elongated in a longitudinal direction and a tongue portion extending from the base portion in a mating direction perpendicular to the longitudinal direction;
a plurality of conductive terminals, each of the plurality of conductive terminals comprising a mating portion held by the tongue portion of the insulative housing, a tail portion opposite the mating portion and extending out of the insulative housing, and an intermediate portion extending between the mating portion and the tail portion and held in the base portion of the insulative housing; and
a shielding member disposed in the insulative housing, the shielding member comprising a conductive member extending from the base portion to the tongue portion of the insulative housing, and a protrusion protruding from the conductive member towards a respective conductive terminal and extending from an edge portion of the tongue portion to a joint of the tongue portion and the base portion, wherein:
the plurality of conductive terminals comprise a plurality of pairs of differential signal terminals and ground terminals disposed between adjacent pairs of the plurality of pairs of differential signal terminals; and
the shielding member comprises lossy material comprising a plurality of protrusions, the plurality of protrusions comprising the protrusion, each of the plurality of protrusions protruding from the conductive member towards a respective ground terminal such that the shielding member is configured to electrically connect the ground terminals.

12. The plug connector of claim 11, wherein:
the protrusion is in direct contact with the mating portion of the respective conductive terminal.

13. The plug connector of claim 11, wherein:
the tongue portion comprises a plurality of terminal slots recessed into the tongue portion from two opposite outer surfaces of the tongue portion;
the mating portions of the plurality of conductive terminals are received in respective ones of the plurality of terminal slots; and
the protrusion is exposed at a bottom of a corresponding one of the plurality of terminal slots.

14. The plug connector of claim 11, wherein:
the plurality of conductive terminals are arranged in a first group of conductive terminals and a second group of conductive terminals in the longitudinal direction on opposite sides of the shielding member; and
at least one of the first and second groups of conductive terminals comprise the plurality of pairs of differential signal terminals and ground terminals disposed between adjacent pairs of the plurality of pairs of differential signal terminals.

15. The plug connector of claim 14, wherein:
each of the first and second groups of conductive terminals comprises a plurality of pairs of differential
signal terminals, and ground terminals disposed between adjacent pairs of the plurality of pairs of signal terminals;
the plurality of protrusions comprise a plurality of first protrusions extending towards the ground terminals
in the first group of conductive terminals and a plurality of second protrusions extending towards the ground terminals in the second group of conductive terminals;
each of the plurality of first protrusions extend from the edge portion of the tongue portion to the joint of the tongue portion and the base portion; and
each of the plurality of second protrusions extend from the edge portion of the tongue portion into the base portion.

16. The plug connector of claim 15, wherein:
the plurality of first protrusions are offset from the plurality of second protrusions in the longitudinal direction.

17. The plug connector of claim 11, wherein:
the conductive member comprises a plurality of openings; and
each opening is aligned with mating contact portions of the mating portions of a respective pair of the plurality of pairs of differential signal terminals.

18. A plug connector, comprising:
an insulative housing comprising a base portion and a tongue portion extending from the base portion;
a shielding member comprising a conductive member disposed in the tongue portion and lossy material extending from opposite sides of the conductive member; and
a plurality of conductive terminals, each of the plurality of conductive terminals comprising a mating portion held by the tongue portion of the insulative housing, a tail portion opposite the mating portion and extending out of the insulative housing, and an intermediate portion extending between the mating portion and the tail portion and held in the base portion of the insulative housing, wherein:
the plurality of conductive terminals comprise a first plurality of differential signal pairs disposed on a second side of the opposite sides of the conductive member;
each conductive terminal of the first plurality of differential signal pairs comprises a portion separated from the conductive member by air;
the conductive member comprises a plurality of first openings; and
each first opening is aligned with mating contact portions of the mating portions of a respective pair of the first plurality of differential signal pairs.

19. The plug connector of claim 18, wherein:

the plurality of conductive terminals comprise a second plurality of differential signal pairs disposed on a first side of the opposite sides of the conductive member; and each conductive terminal of the second plurality of differential signal pairs is separated from the conductive member by an outer surface of the tongue portion of the insulative housing.

20. The plug connector of claim 18, wherein:

the conductive member comprises a plurality of second openings; and the lossy material extends from a first side of the conductive member through the plurality of second openings to the second side of the conductive member.

* * * * *